United States Patent
Deo et al.

(12) 
(10) Patent No.: US 6,393,481 B1
(45) Date of Patent: May 21, 2002

(54) METHOD AND APPARATUS FOR PROVIDING REAL-TIME CALL PROCESSING SERVICES IN AN INTELLIGENT NETWORK

(75) Inventors: Ajay P. Deo, Lewisville, TX (US); Sami Syed, Tervuren (BE); Henry Wang, Irvine, CA (US); Wendy T. Wong, Dallas, TX (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/421,827

(22) Filed: Oct. 20, 1999

Related U.S. Application Data

(63) Continuation-in-part of application No. 09/128,937, filed on Aug. 5, 1998.
(60) Provisional application No. 60/061,173, filed on Oct. 6, 1997, and provisional application No. 60/104,890, filed on Oct. 20, 1998.

(51) Int. Cl.[7] .............................................. G06F 15/173
(52) U.S. Cl. ..................... 709/224; 709/218; 709/223; 709/224; 709/226; 709/249; 379/201; 379/207; 379/219; 379/220; 379/230; 379/266; 340/201; 340/219; 340/220; 340/522; 340/585
(58) Field of Search ............................. 370/201, 219, 370/220, 585, 522; 379/201, 219, 220, 266, 207, 230; 709/224, 218, 226, 223, 249

(56) References Cited

U.S. PATENT DOCUMENTS

| | | |
|---|---|---|
| 4,713,806 A | 12/1987 | Oberlander |
| 5,157,390 A | 10/1992 | Yoshie et al. |
| 5,323,452 A | 6/1994 | Dickman et al. |
| 5,335,268 A | 8/1994 | Kelly, Jr. et al. |
| 5,450,480 A | 9/1995 | Man et al. |
| 5,463,682 A | 10/1995 | Fisher et al. |
| 5,475,817 A | 12/1995 | Waldo et al. |
| 5,537,466 A | 7/1996 | Taylor et al. |
| 5,551,035 A | 8/1996 | Arnold et al. |

(List continued on next page.)

FOREIGN PATENT DOCUMENTS

| | | |
|---|---|---|
| WO | 00/23898 | 4/2000 |
| WO | 00/24182 | 4/2000 |

*Primary Examiner*—Robert B. Harrell
*Assistant Examiner*—Farzaneh Farahi

(57) ABSTRACT

System and methodology for providing real-time call processing services received at a switch in an intelligent network having one or more service nodes having originating switches for receiving a call event. The system includes a platform-independent communication system for enabling communication between object instances executing at service nodes in the intelligent network. An operating system agent object instance executing in an execution environment associated with an originating switch communicates call origination information corresponding to a call event received at the switch to one or more object instances executing in an execution environment provided at a service node in the network; the object instances including a line object instance for maintaining the state of a communications line associated with a call origination, and, a service object implementing methods for performing a service according to a customer request. A first database storage device accessible by the service object provides call routing information according to a customer's subscription. A second database storage device is accessible by the service object to provide a corresponding terminating switch location address at a node in the network for the call based on the retrieved call routing information. The platform-independent communication system communicates call routing commands between the service object and at least the line object instance, for enabling call connection between originating and terminating switches independent of their location in the network.

16 Claims, 22 Drawing Sheets

U.S. PATENT DOCUMENTS

| | | |
|---|---|---|
| 5,619,557 A | 4/1997 | Van Berkum |
| 5,644,629 A | 7/1997 | Chow |
| 5,664,102 A | 9/1997 | Faynberg |
| 5,742,668 A | 4/1998 | Pepe et al. |
| 5,754,939 A | 5/1998 | Herz et al. |
| 5,799,153 A | 8/1998 | Blau et al. |
| 5,825,865 A | 10/1998 | Oberlander et al. |
| 5,826,268 A | 10/1998 | Shaefer et al. |
| 5,838,970 A | 11/1998 | Thomas |
| 5,867,498 A | 2/1999 | Giltman et al. |
| 5,881,134 A | 3/1999 | Foster et al. |
| 5,898,839 A | 4/1999 | Berteau |
| 5,907,607 A | 5/1999 | Waters et al. |
| 5,915,008 A | 6/1999 | Dulman |
| 5,940,616 A | 8/1999 | Wang |
| 5,958,016 A | 9/1999 | Chang et al. |
| 5,966,434 A | 10/1999 | Schafer |
| 5,999,965 A | 12/1999 | Kelly |
| 6,041,109 A | 3/2000 | Waller et al. |
| 6,041,117 A | 3/2000 | Androski |

METHOD AND APPARATUS FOR PROVIDING REAL-TIME CALL PROCESSING SERVICES IN AN INTELLIGENT NETWORK

CROSS-REFERENCE TO RELATED APPLICATION

This Application is a Continuation-In-Part of commonly assigned, U.S. patent application Ser. No. 09/128,937 filed Aug. 5, 1998 entitled "Intelligent Call Platform for an Intelligent Network Distributed Architecture" which claims the benefit of U.S. Provisional Application Ser. No. 60/061, 173, filed Oct. 6, 1997 both of which are incorporated herein in their entirety by reference thereto. This application additionally claims the benefit of U.S. Provisional Application Ser. No. 60/104,890 filed Oct. 20, 1998 the whole contents and disclosure of which is incorporated by reference as if fully set forth herein.

FIELD OF THE INVENTION

The present invention relates generally to intelligent network systems for providing communications services, and specifically, to a novel service control system for providing real-time event processing services at each of a plurality of services nodes distributed throughout an intelligent network.

BACKGROUND OF THE INVENTION

A network service is a function performed by a communications network, such as data or telephony, and its associated resources in response to an interaction with one or more subscribers. For example, a telephony network resident service, such as call forwarding or voice mail access, can be invoked by a subscriber by dialing a special sequence of digits. Other network services may be directed at assisting a network owner with security, validation, and authentication. Adding or modifying a service requires changes to be made in the communications network.

Most conventional telecommunication networks are composed of interconnected switches and communication services. These switches are controlled by integrated or imbedded processors operated by proprietary software or firmware designed by the switch manufacturer. Typically, the switch manufacturer's software or firmware must support all functional aspects of service processing, call processing, facility processing and network management. This means that when a network owner wishes to implement a new service or modify an existing service, the software of every switch in the network must be revised by the various switch manufacturers.

The fact that the network contains different switch models from different manufacturers requires careful development, testing and deployment of the new software. The time required to develop, test and deploy the new software is lengthened because the code size at each switch grows larger and more complex with each now revision. Thus, this process can take several years. In addition, this increased complexity further burdens the switch processors, increases the chances for switch malfunction, and may require the modification or replacement of the switch.

Moreover, the fact that multiple network owners depend upon a common set of switch manufacturers results in two undesirable situations that limit competition. First, a manufacturers' software release may attempt to incorporate changes requested by several network owners, thus preventing the network owners from truly differentiating their services from the services provided by their competition. This also forces some network owners to wait until the manufacturer incorporates requests from other network owners into the new release. Second, a switch software release incorporating a function as requested by one network owner to implement a new service can unintentionally become accessible to other network owners.

These problems have become intolerable as the demand for new network services has increased exponentially over the last five to ten years due to increased subscriber mobility, increased variety and bandwidth of traffic, dissolution of traditional numbering plans, more sophisticated services and increased competition. Thus, it is widely recognized that new network architectures need to incorporate a more flexible way of creating, deploying and executing service logic. In order to fully appreciate the novel architecture of the present invention hereinafter described, the following description of the relevant prior art is provided with reference to FIG. 1.

Referring to FIG. 1, a logical representation of various switching architectures, including the present invention, is shown. A monolithic switch, which is denoted generally as 20, contains service processing functions 22, call processing functions 24, facility processing functions 26 and a switch fabric 28. All of these functions 22, 24, 26 and 28 are hard-coded, intermixed and undifferentiated, as symbolized by the group 30. Moreover, functions 22, 24, 26 and 28 are designed by the switch manufacturer and operate on proprietary platforms that vary from manufacturer to manufacturer. As a result, these functions 22, 24, 26 and 28 cannot be modified without the aid of the manufacturer, which slows down service development and implementation, and increases the cost of bringing a new service to market. The development of new and innovative services, call processing, data processing, signal processing and network operations are, therefore, constrained by the manufacturer's control over their proprietary switch hardware and software, and the inherent difficulty of establishing and implementing industry standards.

The service processing functions 22 are encoded within the monolithic switch 20 and only allow local control of this process based on local data contents and the number dialed. This local information is interpreted by a hard-coded process engine that carries out the encoded service function. The call processing functions 24 are hard-coded and provide call origination and call termination functions. This process actually brings up and takes down individual connections to complete a call. Likewise, the facility processing functions 26 are also hard-coded and provide all data processing relating to the physical resources involved in a call. The switch fabric 28 represents the hardware component of the switch and the computer to run the monolithic software provided by the switch manufacturer, such as Northern Telecom, Inc. The switch fabric 28 provides the physical facilities necessary to establish a connection and may include, but is not limited to, bearer devices (Tl's and DSO's), switching matrix devices (network planes and their processors), link layer signal processors (SS7, MTP, ISDN, LAPD) and specialized circuits (conference ports, audio tone detectors).

In an attempt to address the previously described problems, the International Telecommunications Union and the European Telecommunication Standards Institute endorsed the ITU-T Intelligent Network Standard ("IN"). Similarly, Bellcore endorsed the Advanced Intelligent Network Standard ("AIN"). Although these two standards differ in presentation and evolutionary state, they have almost identical objectives and basic concepts. Accordingly, these standards are viewed as a single network architecture in which the service processing functions 22 are separated from the switch.

Using the IN and AIN architectures, a network owner could presumably roll out a new service by creating and deploying a new Service Logic Program ("SLP"), which is essentially a table of Service Independent Building Blocks ("SIBB") to be invoked during a given type of call. According to this approach, a number of specific element types inter-operate in conjunction with a SLP to provide services to network subscribers. As a result, any new or potential services are limited by the existing SIBBS.

The In or AIN architecture, which is denoted generally as 40, logically separates the functions of the monolithic switch 20 into a Service Control Point ("SCP") 42, and a Service Switching Point ("SSP") and Switching System 44. The SCP 42 contains the service processing functions 22, whereas the SSP and Switching System 44 contain the call processing functions 24, facility processing functions 26 and the switch fabric 28. In this case, the call processing functions 24, facility processing functions 26 and the switch fabric 28 are hard-coded, intermixed and undifferentiated, as symbolized by the group 46.

The Service Switching Point ("SSP") is a functional module that resides at a switch in order to recognize when a subscriber's signaling requires more than simple routing based solely upon the number dialed. The SSP suspends further handling of the call while it initiates a query for correct handling of the call to the remote SCP 42, which essentially acts as a database server for a number of switches. This division of processing results in the offloading of the infrequent, yet time consuming task of handling special service calls, from the switch. Furthermore, this moderate centralization draws a balance between having one readily modifiable, heavy burdened repository serving the whole network versus deploying a complete copy of the repository at every switch.

Referring now to FIG. 2, a diagram of a telecommunications system employing an IN or AIN architecture is shown and is denoted generally as 50. Various customer systems, such as an ISDN terminal 52, a first telephone 54, and a second telephone 56 are connected to the SSP and Switching System 44. The ISDN terminal 52 is connected to the SSP and Switching System 44 by signaling line 60 and transport line 62. The first telephone 54 is connected to the SSP and Switching System 44 by transport line 64. The second telephone 56 is connected to a remote switching system 66 by transport line 68 and the remote switching system 66 is connected to the SSP and Switching System 44 by transport line 70.

As previously described in reference to FIG. 1, the SSP 70 is a functional module that resides at a switch in order to recognize when a subscriber's signaling requires more than simple routing based upon the number dialed. The SSP 70 suspends further handling of the call while it initiates a query for correct handling of the call. This query is sent in the form of SS7 messaging to a remote SCP 42. The Service Control Point 42 is so named because changing the database content at this location can alter the network function as it appears to subscribers connected through the many subtending switches. The query is sent through signaling line 72 to the Signal Transfer Point ("STP") 74, which is simply a router for SS7 messaging among these elements, and then through signaling line 76 to the SCP 42.

The Integrated Service Management System ("ISMS"), 78 is envisioned as a management tool to deploy or alter services or to manage per-subscriber access to services. The ISMS 78 operates mainly by altering the operating logic and data stored within the SSP 70 and SCP 42. The ISMS 78 has various user interfaces 80 and 82. This ISMS 78 is connected to the SCP 42 by operations line 84, the SSP and Switching System 44 by operations line 86, and the Intelligent Peripheral ("IP") 88 by operations line 90. The Intelligent Peripheral 88 is a device used to add functions to the network that are not available on the switches, such as a voice response or speech recognition system. The IP 88 is connected to the SSP and Switching System 44 by signaling line 92 and transport line 94.

Now referring to FIG. 2, the processing of a call in accordance with the prior art will be described. The call is initiated when the customer picks up the receiver and begins dialing. The SSP 70 at the company switch monitors the dialing and recognizes the trigger sequence. The SSP 70 suspends further handling of the call until service logic can be consulted. The SSP 70 then composes a standard SS7 message and sends it through STP(s) 74 to the SCP 42. The SCP 42 receives and decodes the message and invokes the SLP. The SLI interprets the SCP, which may call for actuating other functions such as database lookup for number translation. The SCP 42 returns an SS7 message to the SSP and Switching System 44 regarding the handling of the call or otherwise dispatches messages to the network elements to carry out the correct service. At the conclusion of the call, an SS7 message is sent among the switches to tear down the call and call detail records are created by each switch involved in the call. The call detail records are collected, correlated, and resolved offline for each call to derive billing for toll calls thus, completing call processing.

The IN and AIN architectures attempt to predefine a standard set of functions to support all foreseeable services. These standard functions are all hard-coded into various state machines in the switch. Unfortunately, any new functions, which are likely to arise in conjunction with new technologies or unforeseen service needs, cannot be implemented without an extensive overhaul and testing of the network software across many vendor platforms. Furthermore, if a new function requires changes to standardized call models, protocols, or interfaces, the implementation of the service utilizing that function may be delayed until the changes are ratified by an industry standards group. But even as draft standards have attempted to broaden the set of IN and AIN supported functions, equipment suppliers have refused to endorse these draft standards due to the staggering increase in code complexity. A detailed flow chart describing the process for generic service creation according to the prior art may be found in above-mentioned, commonly-owned, co-pending U.S. patent application Ser. No. 09/128,937 filed Aug. 5, 1998 entitled "Intelligent Call Platform for an Intelligent Network Distributed Architecture", the contents and disclosure of which is incorporated by reference as if fully set forth herein.

In further view of FIG. 2, other limitations of the IN and AIN architecture arise from having the call processing and facility processing functions, namely, the SSP 70, operating within the switch. As a result, these functions must be provided by each switch manufacturer using their proprietary software. Network owners are, therefore, still heavily dependent upon manufacturer software releases to support new functions. To further complicate the matter, the network owner cannot test SSP 70 modules in conjunction with other modules in a unified development and test environment. Moreover, there is no assurance that an SSP 70 intended for a switch manufacturer's processing environment will be compatible with the network owner's service creation environment.

This dependency of multiple network owners upon a common set of switch manufacturers results in two undesirable situations that limit competition. First, a manufacturer's software release may attempt to incorporate changes requested by several network owners, thus preventing the network owners from truly differentiating their services from the services provided by their competition. This also forces some network owners to wait until he manufacturer incorporates requests from other network owners into the new release. Second, a switch software release incorporating a function as requested by one network owner to implement a new service can unintentionally become accessible to other network owners. Therefore, despite the intentions of the IN and AIN architects, the network owner's creation, testing and deployment of new services is still impeded because the network owner does not have complete control of, or access to, the functional elements that shape network service behavior.

In another attempt to solve these problems, as disclosed in pending U.S. patent application Ser. No. 08/580,712, a Separate Switch Intelligence and Switch Fabric ("SSI/SF") architecture, which is referred to generally as 150 (FIG. 1), logically separates the SSP 70 from the Switching System 44. Now referring back to FIG. 1, the switch intelligence 152 contains the call processing functions 24 and facility processing functions 26 that are encoded in discrete state tables with corresponding hard-coded state machine engines, which is symbolized by circles 154 and 156. The interface between the switch fabric functions 158 and switch intelligence functions 152 may be extended through a communications network such that the switch fabric 158 and switch intelligence 152 may not necessarily be physically located together, by executed within the same processor or even have a one-to-one correspondence. In turn, the switch intelligence 152 provides a consistent interface of simple non-service-specific, non-manufacturer-specific functions common to all switches.

An Intelligent Computing Complex ("ICC") 160, contains the service processing functions 22 and communicates with multiple switch intelligence elements 152. This approach offers the network owner advantages in flexible service implementation because all but the most elementary functions are moved outside of the realm of the manufacturer-specific code. Further improvements may be realized by providing a more unified environment for the creation, development, test and execution of service logic.

As previously discussed, current network switches are based upon monolithic proprietary hardware and software. Although network switches can cost millions of dollars, such equipment is relatively slow in terms of processing speed when viewed in light of currently available computing technology. For example, these switches are based on Reduced-Instruction Set Computing ("RISC") processors running in the range of 60 MHz and communicate with each other using a data communications protocol, such as X.25, that typically supports a transmission rate of 9.6 Kb/s between various platforms in a switching network. This is extremely slow when compared to personal computers that contain processors running at 200 MHz or above and high end computer workstations that offer 150 Mb/s FDDI and ATM interfaces. Accordingly, network owners need to be able to use high-end workstations instead of proprietary hardware.

SUMMARY OF THE INVENTION

The present invention is directed to a service control system for providing real-time service processing all of the events and service requests received at a resource complex, e.g., switch or router, physically associated with each of a plurality of distributed service nodes of an intelligent communications network.

Generally, the service control component of the invention is capable of instructing the intelligent network resource complex, e.g., ATM switch, Internet gateway, Intelligent Peripheral, or other switch or router resource, in the processing of service requests, and further encompasses the intelligence required to process the service requests. Particularly, the intelligence built in enables Service Control components to interact with other intelligent network components to access additional logic or to obtain information (service or user data) required to process a service logic instance. Service Control interfaces and interacts with the resource complex and a local data management system during real time service processing and, possesses the logic and processing capability required to handle intelligent network provided service attempts. Service Control is managed, updated and administered by a service administrator and data management components of the intelligent network. The intelligent network provides intelligent call processing services independent of and transparent to the call switching platform or resource complex in which a call is received, and is readily adapted to handle call events. Thus, the dependency for expensive, vendor-specific hardware, operating systems and switching platforms, is eliminated. The distributed intelligent network additionally supports location-independent event processing service execution, enabling the modular software logic programs to be run virtually anywhere in the architecture, and provides location-independent communications among these distributed processes, thus further eliminating the need for specialized service nodes.

More particularly, the invention controls one or more processes which are started when a service request is sent into Service Control component by the resource complex. Service Control interacts with other components to access the required data necessary to provide the requested service. When the requested service behavior sequence is complete or when the service user(s) withdraw from using the service, the process is complete. All the resources involved in serving the service requester on behalf of the request are released at the end of the processing. Each service request initiates one instance (thread) of service processing, thus providing heavy parallel processing with less contingency or bottlenecks.

Preferably, each service thread instance maintains its own event queue with service control providing for the asynchronous channeling events received for a particular call instance onto the appropriate service thread queue for storage and execution thereof according to a pre-determined priority associated with the event. Service control additionally provides for the asynchronous channeling of events to the switch/resource complex, or other executing service logic programs therewith, with the thread instance blocking as it waits for a response.

According to the invention, the major responsibilities of the Service Control component include: accepting and processing events or requests from a switching platform or other external resources; identifying and invoking service logic programs to process the incoming request; requesting service or subscriber related data from a data management storage device through a network operating system (NOS) or directly via a database application programming interface (API); updating service or subscriber related data to a Data Management component through NOS; providing capability to send prioritized events and messages to the resource complex and other service logic programs to control user interaction; receiving message sets from the resource complex—including user input, e.g., PIN, (dual tone multi-frequency) DTMF digits corresponding to a selected menu item, etc.; maintaining states and data of all the participants involved in the same instance of service processing; and, generating billing records and transmitting them to billing record generation function of the Data Management component.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF THE DRAWINGS

The above and further advantages of the present invention may be better understood by referring to the following description in conjunction with the accompanying drawings, in which.

DETAILED DESCRIPTION

The present invention is one component of a comprehensive intelligent network alternately referred to herein as the an Intelligent Distributed Network Architecture ("IDNA") or the Next Generation Intelligent Network ("NGIN") As described herein, the NGIN architecture is designed to perform intelligent call processing services for any type of call received at a resource complex or switching platform, e.g., switch, router, IP termination address, etc. The IDNA/NGIN preferably comprises a plurality of distributed service nodes with each node providing an execution environment providing call processing functionality necessary to handle a call at the instance it is received at the switch or resource complex physically associated with that particular service node. NGIN is of a highly scalable architecture and engineered to ensure that executable service objects, embodied as independent Service Logic Programs ("SLP") , and associated data for performing event services, e.g., 1-800 telephone call, send fax, etc., may be deployed to and maintained at the service nodes in a cost-effective manner. By employing CORBA-compliant Object Request Broker technology, the intelligent network supports location and platform-independent call processing service execution independent of and transparent to the event switching platform or resource complex in which an event or call is received, and, enables high-level logic programs to be run virtually anywhere in the network independent of the service execution platform. Furthermore, the system provides location-independent communications among these distributed processes.

Figure 1:
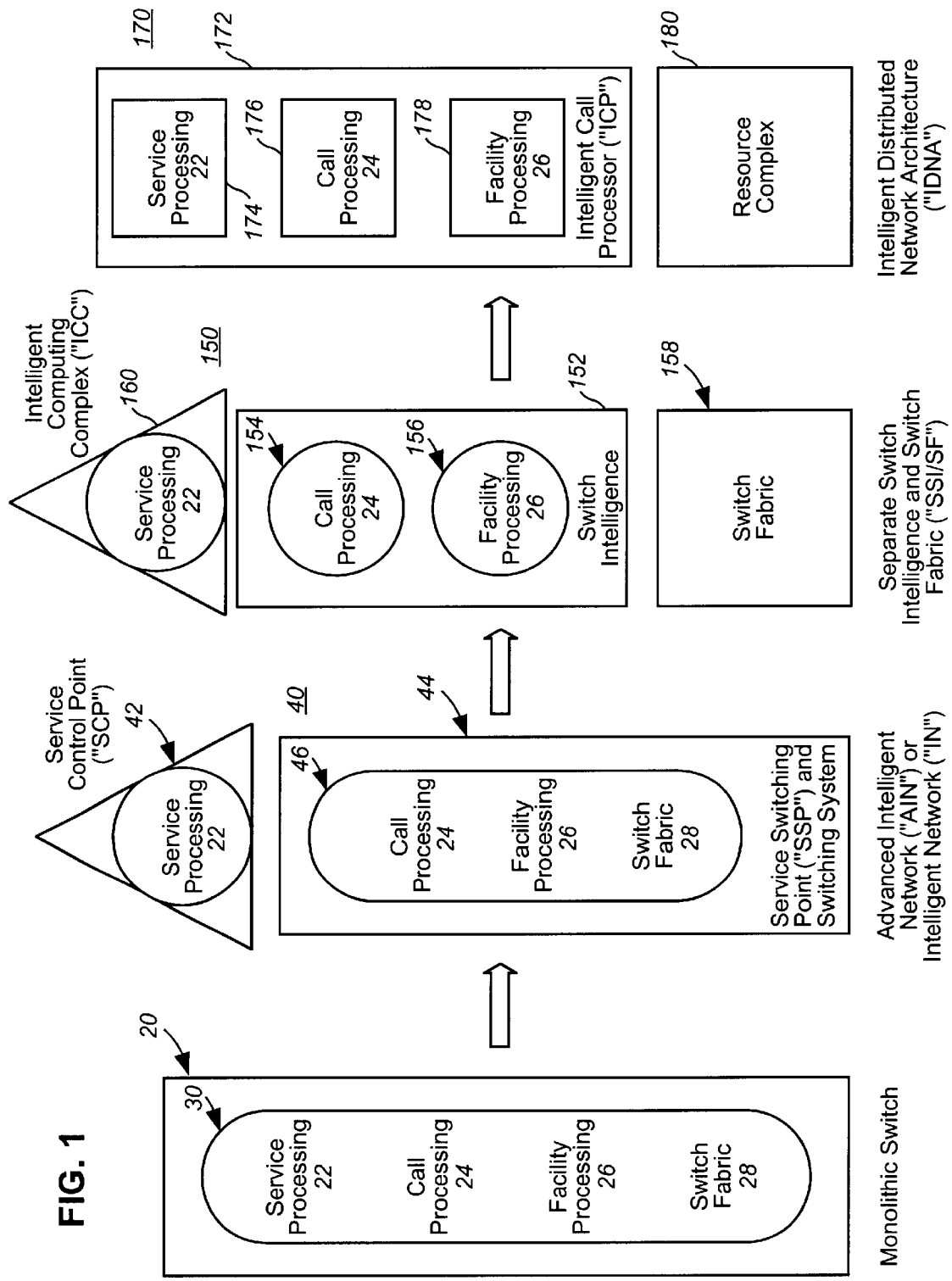
FIG. 1 is logical representation of various switching architectures.
Figure 2:
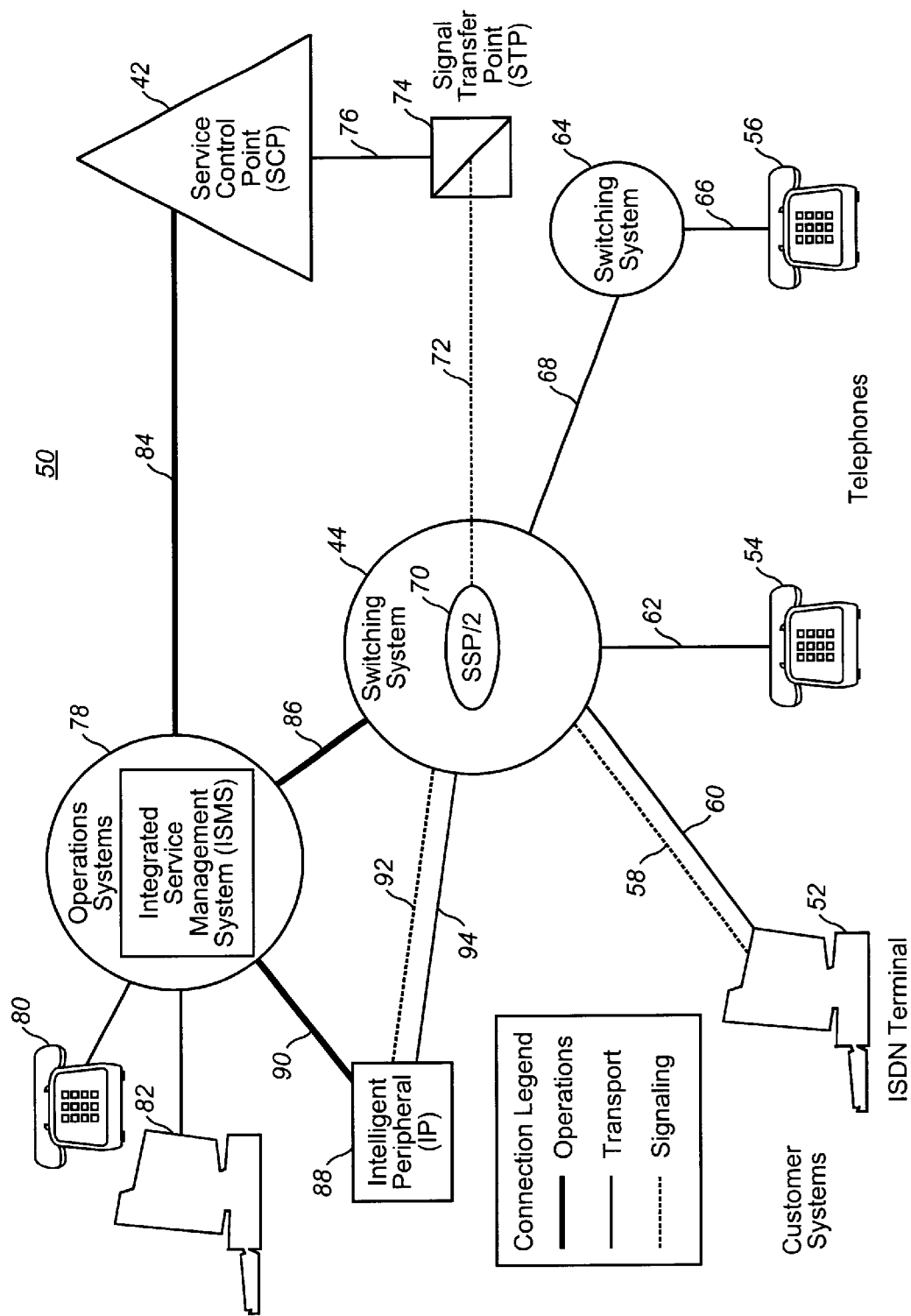
FIG. 2 is a diagram of a telecommunications system employing a typical intelligent network configuration according to the prior art.

Now referring to FIG. 1, the Intelligent Distributed Network Architecture ("IDNA") is denoted generally as 170. The present invention unifies the ICC 160 and Switch Intelligence 152 of the SSI/SF architecture 150 into an Intelligent Call Processor ("ICP") 172. Unlike the IN or AIN of SSI/SF architectures 40, whose functions are defined in state tables, the ICP 172 contains the service control functions 22, call processing functions 24 and facility processing functions 26 as managed objects in an object-oriented platform, which is symbolized by blocks 174, 176 and 178. The ICP 172 is logically separated from the Resource Complex 180.

Now referring to FIG. 3, a telecommunications system employing an intelligent distributed network architecture in accordance with the present invention will be described and is denoted generally as 200. The Wide Area Network ("WAN") 202 is a system that supports the distribution of applications and data across a wide geographic area. The transport network is based upon Synchronous Optical NETwork ("SONET") and connects the IDNA Nodes 204 and enables the applications within those nodes to communicate with each other.

Each IDNA Node 204 contains an Intelligent Call Processor ("ICP") 172 and a Resource Complex 180 (FIG. 1). FIG. 3 illustrates an IDNA Node 204 having a Resource Complex A ("RCA") 206 and a Resource Complex B ("RCB") 208. The ICP can be linked to Adjunct Processors 210, which provide existing support functions, such as provisioning, billing and restoration, however, these functions may be absorbed by functionality provided by a Network Management System ("NMS") 212. In the preferred embodiment, however, these support functions may be provided by a centralized Service Administration ("SA") system 500 having Data Management ("DM") component 400 as will be described herein with respect to FIG. 4(*a*). As further shown in FIG. 3, the ICP 172 can be also linked to other ICP's 172, other networks (not shown), or other devices (not shown) through a direct link 214 having signaling 216 and bearer links 218. A direct link prevents latency between the connected devices and allows the devices to communicate in their own language. The ICP 172 is the "brain" of the IDNA Node 204 and is preferably a general purpose computer, which may range from a single processor with a single memory storage device to a large scale computer network depending on the processing requirements of the IDNA Node 204. Preferably, the general purpose computer will have redundant processing, memory storage and connections.

As used herein, general purpose computers refer to computers that are, or may be assembled with, commercial off-the-shelf components, as opposed to dedicated devices specifically configured and designed for telephone switching applications. The integration of general purpose computers within the calling network affords numerous advantages.

The use of general purpose computers gives the ICP 172 the capability of scaling up with additional hardware to meet increased processing needs. These additions include the ability to increase processing power, data storage, and communications bandwidth. These additions do not require the modification of manufacturer-specific software and/or hardware on each switch in the calling network. Consequently, new services and protocols may be implemented and installed on a global scale, without modification of individual devices in the switching network. By changing from monolithic switches 20 (FIG. 1) to intelligent call processors 172, the present invention provides the foregoing advantages and increased capabilities.

In the case of applications that require more processing power, multi-processing allows the use of less expensive processors to optimize the price/performance ratio for call processing. In other applications, it may be advantageous, necessary or more cost effective to use more powerful machines, such as minicomputers, with higher processing rates.

The ICP 172 may, as noted above, comprise a cluster of general purpose computers operating, for example, on a UNIX or Windows NT operating system. For example, in a large application, supporting up to 100,000 ports on a single Resource Complex, the ICP 172 may consist of sixteen (16) 32 bit processors operating at 333 MHz in a Symmetric Multi-Processor cluster. The processors could, for example, be divided into four separate servers with four processors each. The individual processors would be connected with a System Area Network ("SAN") or other clustering technology. The processor cluster could share access to Redundant Array of Independent Disks ("RAID") modular data storage devices. Shared storage may be adjusted by adding or removing the modular disk storage devices. The servers in the clusters would preferably share redundant links to the RC 180 (FIG. 1).

As illustrated and like the "plug and play" feature of personal computers, the ICP software architecture is an open processing model that allows the interchangeability of: (1) management software; (2) ICP applications; (3) computing hardware and software; (4) resource complex components; and even (5) service architecture and processing. Such a generic architecture reduces maintenance costs due to standardization and provides the benefits derived from economies of scale.

Thus, the present invention enables the partitioning of development work and the use of modular tools that result in faster development and implementation of services. Moreover, the use of and the relevant aspects of service management are within the control of the network operator on an as required basis as opposed to the constraints imposed by fixed messaging protocol or a particular combination of hardware and software supplied by a given manufacturer.

Through the use of managed objected, the present invention also allows services and functions to be flexibly ("where you want it") and dynamically ("on the fly") distributed across the network based on any number of factors, such as capacity and usage. Performance is improved because service processing 22 (FIG. 1), call processing 24 (FIG. 1) and facility processing 26 (FIG. 1) operate in a homogeneous platform. In addition, the present invention allows the monitoring and manipulation of call sub-elements that could not be accessed before. The present invention also provides for monitoring the usage of functions or services so that when they are outdated or unused they can be eliminated.

The Resource Complex ("RC") 180 (FIG. 1) is a collection of physical devices, or resources, that provide bearer, signaling and connection services. The RC 180, which can include Intelligent Peripherals 88, replaces the switch fabric 28 and 158 (FIG. 1) of the IN or AIN or SSI/SF architecture. Unlike the IN or AIN architecture, the control of the Resource Complex, such as RCA 206 is at a lower level. Moreover, the RCA 206 can contain more than one switch fabric 158. The switch fabrics 158 or other customer interfaces (not shown) connect to multiple subscribers and switching networks via standard telephony connections. These customer systems may include ISDN terminals 52, fax machines 220, telephones 54, and PBX systems 222. The ICP 172 controls and communicates with the RC 180 (FIG. 1), RCA 206 and RCB 208 through a high speed data communications pipe (minimally 100 Mb/sec Ethernet connection) 224. The RC 180, 206 and 208 can be analogized to a printer and ICP 172 can be analogized to a personal computer wherein the personal computer uses a driver to control the printer. The "driver" in the IDNA Node 204 is a Resource Complex Proxy ("RCP") (not shown), which will be described below in reference to FIG. 5. This allows manufacturers to provide an IDNA compliant node using this interface without having to rewrite all of their software to incorporate IDNA models.

In addition, the control of the Resource Complex 180 (FIG. 1), RCA 206 and RCB 208, is at a lower level than typically provided by the AIN or IN architecture. As a result, resource complex manufacturers only have to provide a single interface to support facility and network management processing; they do not have to provide the network owner with specific call and service processing. A low level interface is abstracted into more discrete operations. Having a single interface allows the network owner to choose from a wide spectrum of Resource Complex manufacturers, basing decisions on price and performance. Intelligence is added to the ICP 172 rather than the RC 180, which isolates the RC 180 from changes and reduces its complexity. Since the role of the RC 180 is simplified, changes are more easily made, thus making it easier to migrate to alternative switching and transmission technologies, such as Asynchronous Transfer Mode ("ATM").

Intelligent Peripherals ("IP") 88 provide the ability to process and act on information contained within the actual call transmission path. IP's 88 are generally in a separate Resource Complex, such as RCB 208, and are controlled by the ICP's 172 in a similar manner as RCA 206. IP's can provide the ability to process data in the actual call transmission path in real-time using Digital Signal Processing ("DSP") technology.

The Network Management System ("NMS") 212 is used to monitor and control hardware and services in the IDNA Network 200. A suggested NMS 212 implementation might be a Telecommunications Management Network ("TMN") compliant framework which provides management of the components within the IDNA Network 200. More specifically, the NMS 212 controls the deployment of services, maintains the health of those services, provides information about those services, and provides a network-level management function for the IDNA Network 200. The NMS 212 accesses and controls the services and hardware through agent functionality within the IDNA nodes 204. The ICP-NMS Agent (not shown) within the IDNA Node 204 carries out the commands or requests issued by the NMS 212. The NMS 212 can directly monitor and control RCA 206 and RCB 208 through a standard operations link 226.

Figure 3:
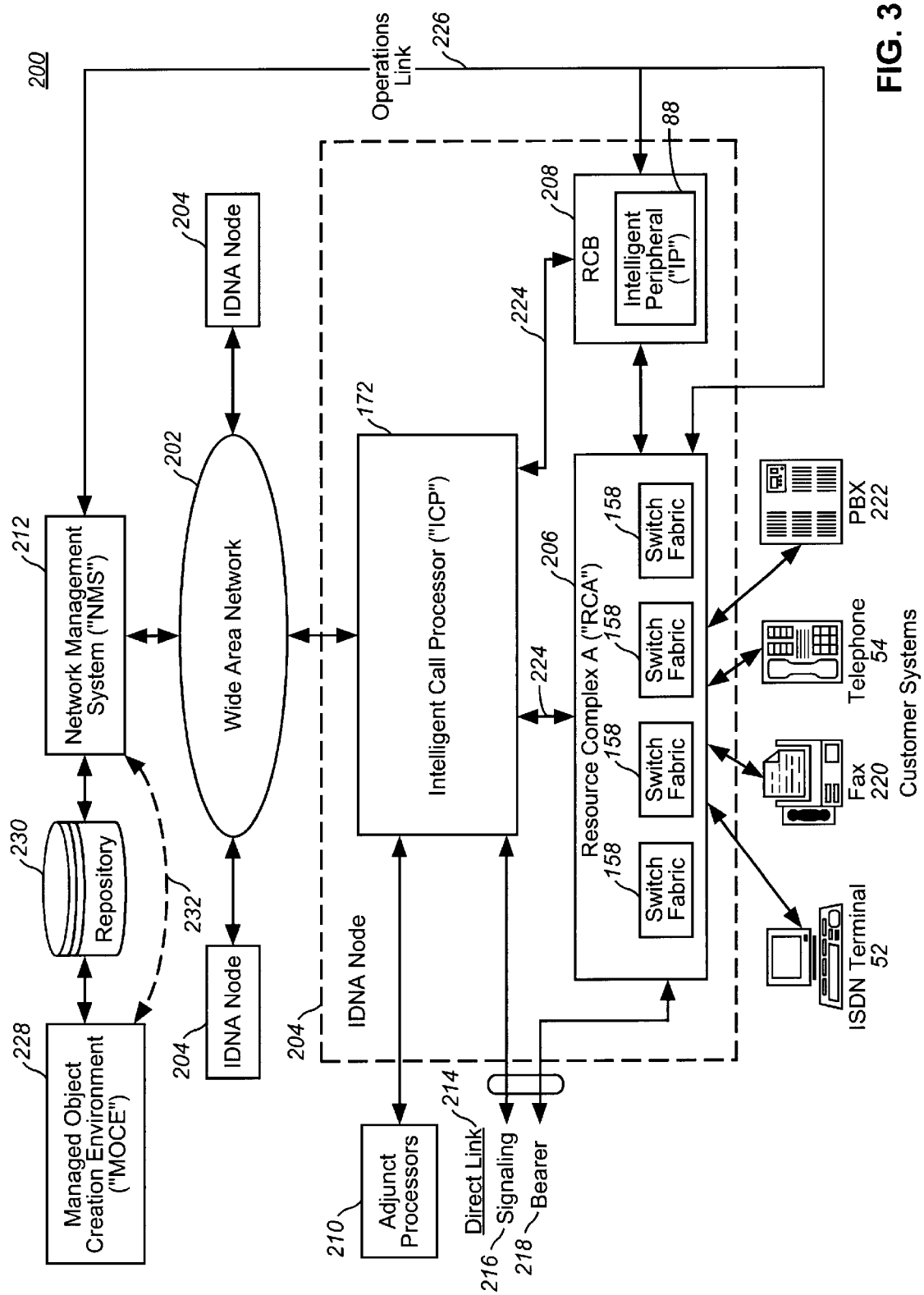
FIG. 3 is a diagram of a telecommunications system employing an intelligent distributed network architecture.

As further shown in FIG. 3, the Managed Object Creation Environment ("MOCE") 228 includes the sub-components to create services that run in the IDNA network 200. A Service Independent Building Block and API representations that a service designer uses to create new services are imbedded within the MOCE'S primary sub-component, a Graphical User Interface ("GUI"). The MOCE 228 is a unified collection of tools hosted on a single user environment or platform, alternately referred to as a Service Creation ("SC") environment. It represents the collection of operations that are required throughout the process of service creation, such as service documentation, managed object definition, interface definition, protocol definition and data input definition, which are encapsulated in managed objects, and service testing. The network owner only has to develop a service once using the MOCE 228, because managed objects can be applied to all the nodes on his network. This is in contrast to the network owner having each of the various switch manufacturers develop their version of the service, which means that the service must be developed multiple times.

The MOCE 228 and NMS 212 are connected together via a Repository 230. The Repository 230 contains the managed objects that are distributed by the NMS 212 and used in the IDNA/NGIN Nodes 204. The Repository 230 also provides a buffer between the MOCE 228 and the NMS 212, The MOCE 228 may, however, be directly connected to the NMS 212 to perform "live" network testing, which is indicated by the dashed line 232.

Figure 4A:
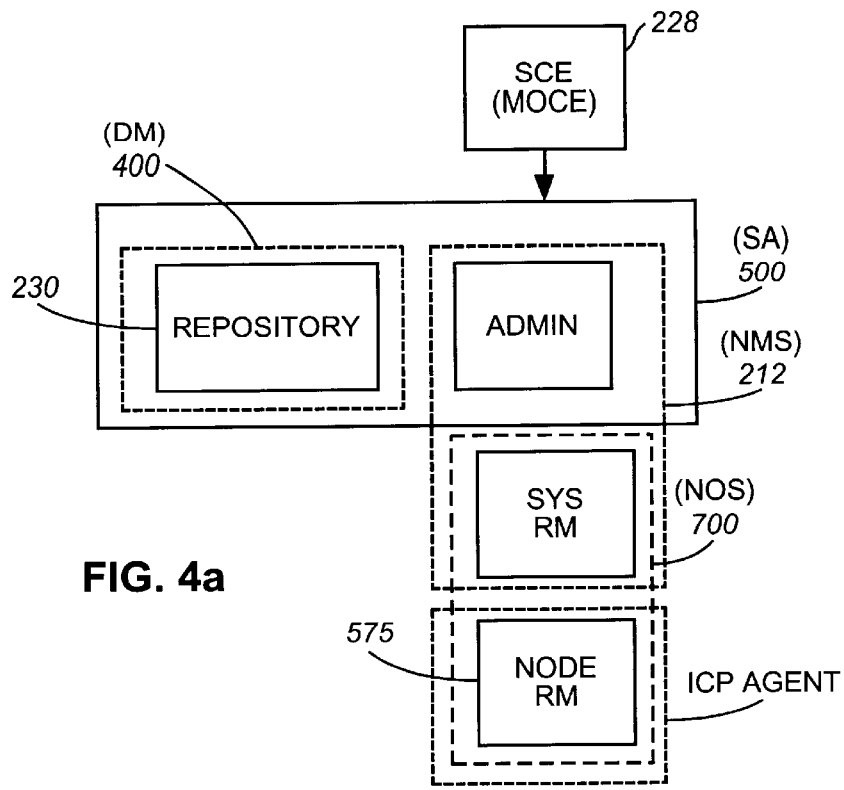
FIG. 4(a) is a block diagram depicting the SA and DM components of the Next Generation Intelligent Network.

In accordance with the preferred embodiment of the invention, as shown in FIG. 4(a), the IDNA/NGIN system includes a centralized Service Administration ("SA") component 500 that provides both a storage (Repository) 230 functionality and the generic network management (NMS) 212 functionality of the IDNA system 170 together with added capabilities as described in greater detail in commonly-owned, co-pending U.S. Patent application Ser. No. 09/421,590, Oct. 20, 1999 entitled METHOD AND APPARATUS FOR DEPLOYING SERVICE MODULES AMONG SERVICE NODES DISTRIBUTED IN AN INTELLIGENT NETWORK, the contents and disclosure of which is incorporated by reference as if fully set forth herein.

Generally, the SA component 500 as shown in FIG. 4(a) supports off-line storage, naming, distribution, activation and removal of all services and data for the IDNA/NGIN system and, additionally provides a data management ("DM") function enabling the run-time storage, replication, synchronization, and availability of data used by the service objects in the IDNA/NGIN service nodes.

Figure 4B:
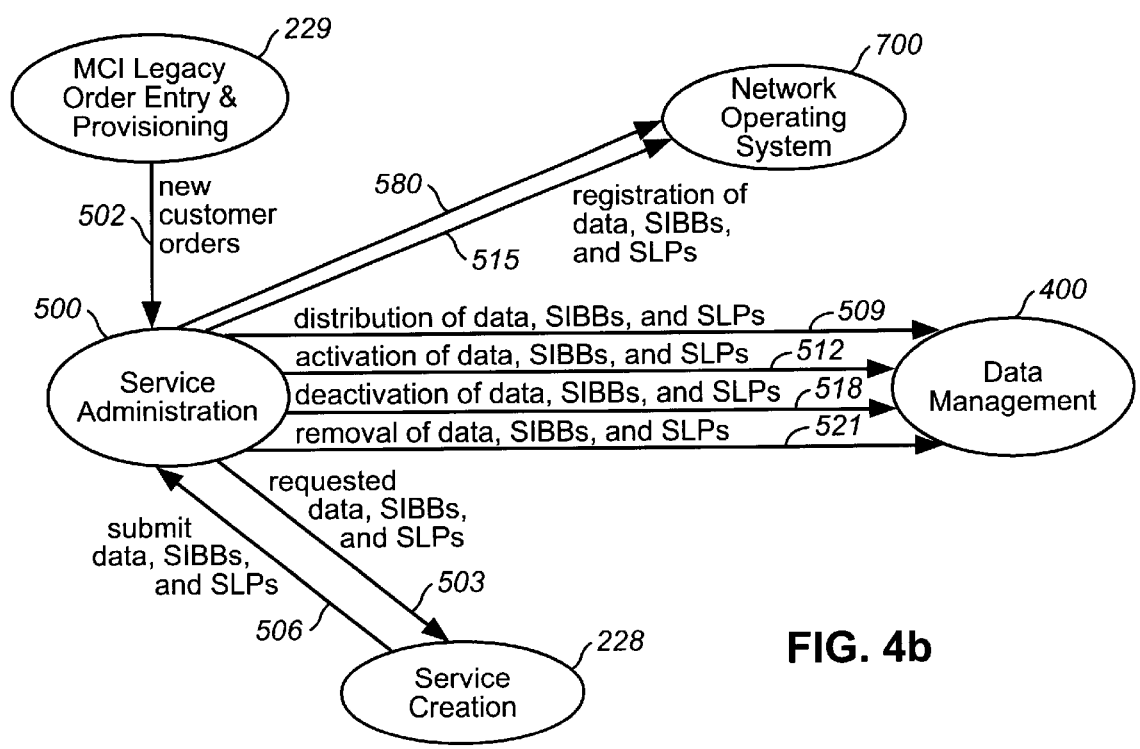
FIG. 4(b) illustrates conceptually the functionality of the service administration component 300.

More particularly, as shown conceptually in FIG. 4(b), the Service Administration component 500 is a component that performs all of the functions needed to manage, store, and distribute all services and service data used by IDNA service processing nodes and to configure both the hardware and software components implemented in the system IDNA/NGIN. Generally, as shown in FIG. 4(b), the SA component 500 is responsible for: receiving the data from MOCE (Service Creation) 228, receiving customer order data 502 from order entry and other legacy systems 229 to provision the IDNA/NGIN system for use by customers; deploying data, Service Independent Building Blocks ("SIBBs") , Service Logic Programs ("SLPs") , and other service logic components 503, e.g., to the MOCE 200 as requested by MOCE/SCE users, for example, during the service creation process; receiving completed and tested service packages, SIBBs, SLPs or other service logic or data components 506 from MOCE 228; providing unique names to each service component; and, distributing the data and each service component 509 to a Data Management functional component 600, to be described in greater detail herein. In addition, as shown in FIG. 4(a), Service Administration 300 maintains the repository 230 which includes a global Database of Record ("DBOR") comprising all IDNA services and data from which the Data Management component 600 receives all of its data.

Other responsibilities of Service Administration include: activating data and service components 512 to ensure that all data, SIBBs and managed objects or service logic programs SLPs are available for nodes via the Data Management component 600; registering the names of the data, SLPs and SIBBs 515 by feeding their logical names to a Network Operating System ("NOS") component 700, to be described in detail below, for registration therewith; deactivating data and service components 518; and, removing data and services 521 from the IDNA/NGIN system via the Data Management component 600. Service Administration additionally performs a configuration management function by maintaining the state of each SIBB and service (pre-tested, post-tested, deployed, etc.), in addition to versioning through its naming process. This ensures a service is not deployed until all components of that service have been successfully tested and configured.

As further shown in FIG. 4(b), the Service Administration component 500 further performs the function of configuring and provisioning the IDNA/NGIN service nodes 204 in accordance with configuration information that SA receives. Particularly, based on the received configuration information, the SA component 500 determines the capabilities of each component at each service node 204, which services and data to distribute to which nodes, which services will run on which server(s) resident at the service node, and which data will be cached to local memory resident associated with IDNA/NGIN node server(s). Particularly, SA deploys configuration rules contained in service profile (configuration) files 580 to a Local (node) Resource Manager ("LRM") component 575 of the NOS system 700 for storage in the local LRM cache located at each service node. These configuration files 580 determine which services to execute at an IDNA node. The LRM first reads this service profile file 580 stored in the local cache at that node, and determines a specific Service Layer Execution Environment ("SLEE"), e.g., a virtual machine, to run a service on in accordance with the rules in the service profile file and, which services are to run actively (as persistent objects) in the SLEE, or are to be instantiated only on-demand.

Referring back to FIG. 4(a), the NGIN Data Management component 600 functions in both a service life-cycle and service utilization capacity. Where the Service Administration component maintains the global database of record (repository), the Data Management component 600 provides the local data store and data management functions for each IDNA/NGIN service node. This includes all types of data including: service programs and SIBBs, data for services (customer profiles, telephone numbers, etc.), multi-media files (such as audio files for Interactive Voice Response ("IVR") services), etc. Specifically, the Data Management component 600 of a service node receives an extract of the SA global DBOR comprising all data needed for the services performed by the local NGIN service node as specified by Service Administration. The mechanics of this will be described in greater detail hereinbelow with respect to FIG. 4(c).

In the preferred embodiment, the Data Management component 600 of the SA component provides local data storage and management functions for each IDNA/NGIN service node. Particularly, Data Management stores data received from Service Administration in one or more databases, and makes services/data readily available for Service Control environment by caching the needed data to memory resident in the Service Control computers, or on a co-located database server so the services/data may be provided to a Service Control service with minimal latency. More generally, the Data Management component 600 performs the real-time storage, replication, synchronization, and availability of data whether received from Service Administration or received as a result of service processing. As described in above-mentioned, co-pending U.S. Patent application Ser. No. 09/421,590 Oct. 20, 1999 these DM functions may be further categorized as: 1) a Data Repository function; 2) a Data Manipulation function; 3) a Data Utility function; and 4) a Billing Record Generation function.

Figure 5:
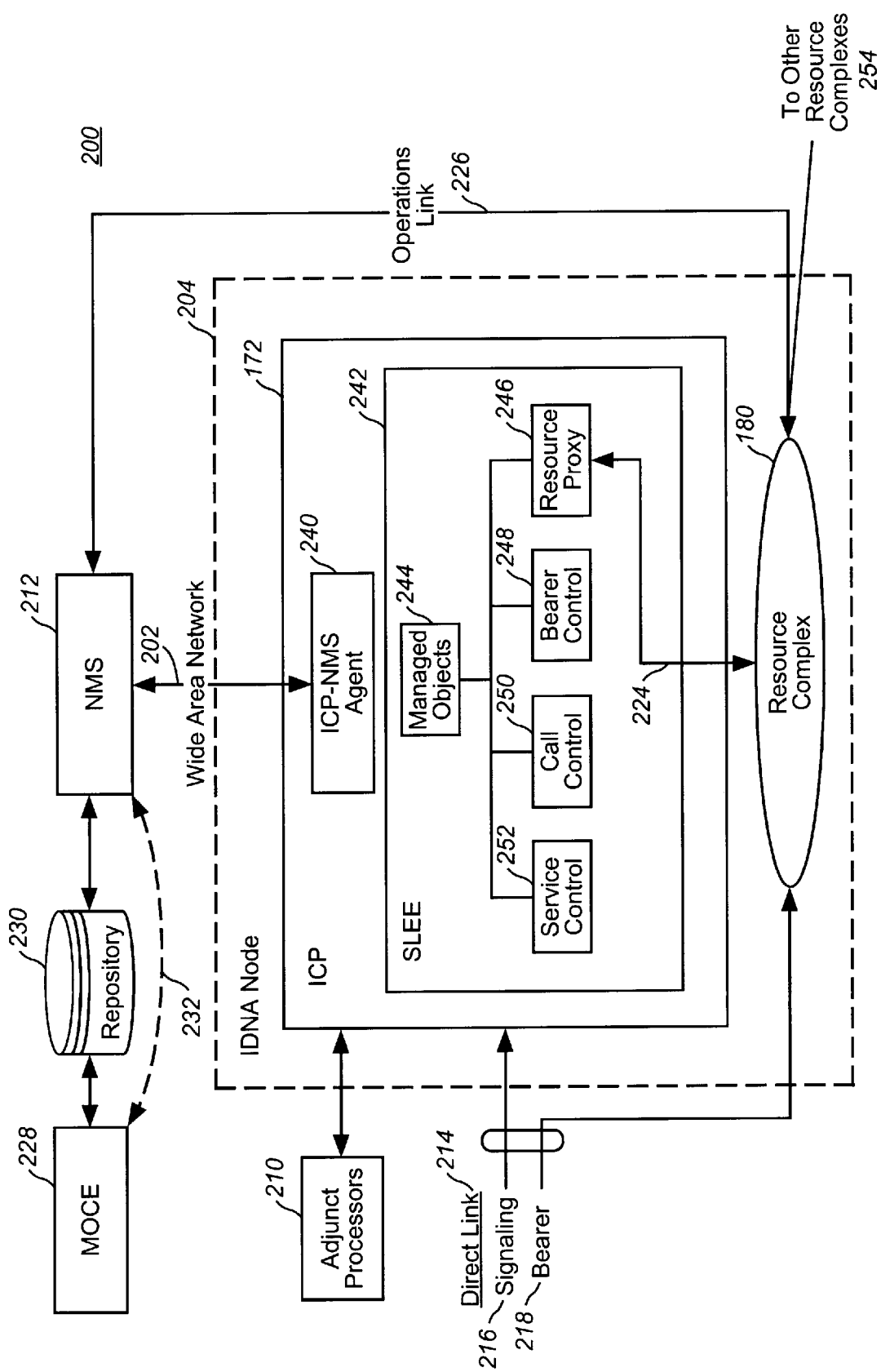
FIG. 5 is a logical and functional diagram of a telecommunications system employing an intelligent distributed network architecture in accordance with the present invention.

Referring now to FIG. 5, a logical and functional diagram of a telecommunications system employing an intelligent distributed network architecture 200 in accordance with the present invention will be described. The ICP 172 is shown to contain an ICP-NMS Agent 240 and a SLEE 242 that, in turn, hosts a variety of managed objects 246, 248, 250 and 252 derived from the managed objects base class 244.

In general, managed objects are a method of packaging software functions wherein each managed object offers both functional and management interfaces to implement the functions of the managed object. The management interface controls access to who and what can access the managed object functions. In the present invention, all of the telephony application software, except for the infrastructure software, run by the IDNA/NGIN Node 204 is deployed as managed objects and supporting libraries. This provides a uniform interface and implementation to control and manage the IDNA Node software.

The collection of network elements that connect, route, and terminate bearer traffic handled by the node will be collectively referred to as the Resource Complex ("RC") 180. The service processing applications running on the SLEE use the Resource Proxy ("RCP") 244 as a control interface to the RC 180. The RCP 244 may be likened to a device driver in that it adapts equipment-independent commands from objects in the SLEE to equipment-specific commands to be performed by the RC 180. The RCP 224 can be described as an interface implementing the basic commands common among vendors of the resources in the RCP 244. The RCP 244 could be implemented as shown as one or more managed objects running on the IDNA node 204. Alternatively, this function could be provided as part of the RC 180. The NMS 212, Repository 230 and MOCE 228 are consistent with the description of those elements in the discussion of FIGS. 3–5(a).

Note that the operations link 226 directly connects the NMS 212 to the RC 180. This corresponds to the more traditional role of a network management system in monitoring the operational status of the network hardware. This can be done independently of the IDNA architecture (e.g., by using the well-known TMN approach). In addition, the RC 180 may be connected to other resource complexes 254. A direct signaling link 214 is also shown entering the ICP 172 so that signaling 216, such as SS7, can enter the call processing environment directly. By intercepting signaling at the network periphery, the SS7 message can go directly to the ICP 172 without going through the RC 180. This reduces latency and improves robustness by shortening the signaling path. An accompanying bearer line 218 connects to the RC 180.

Figure 6:
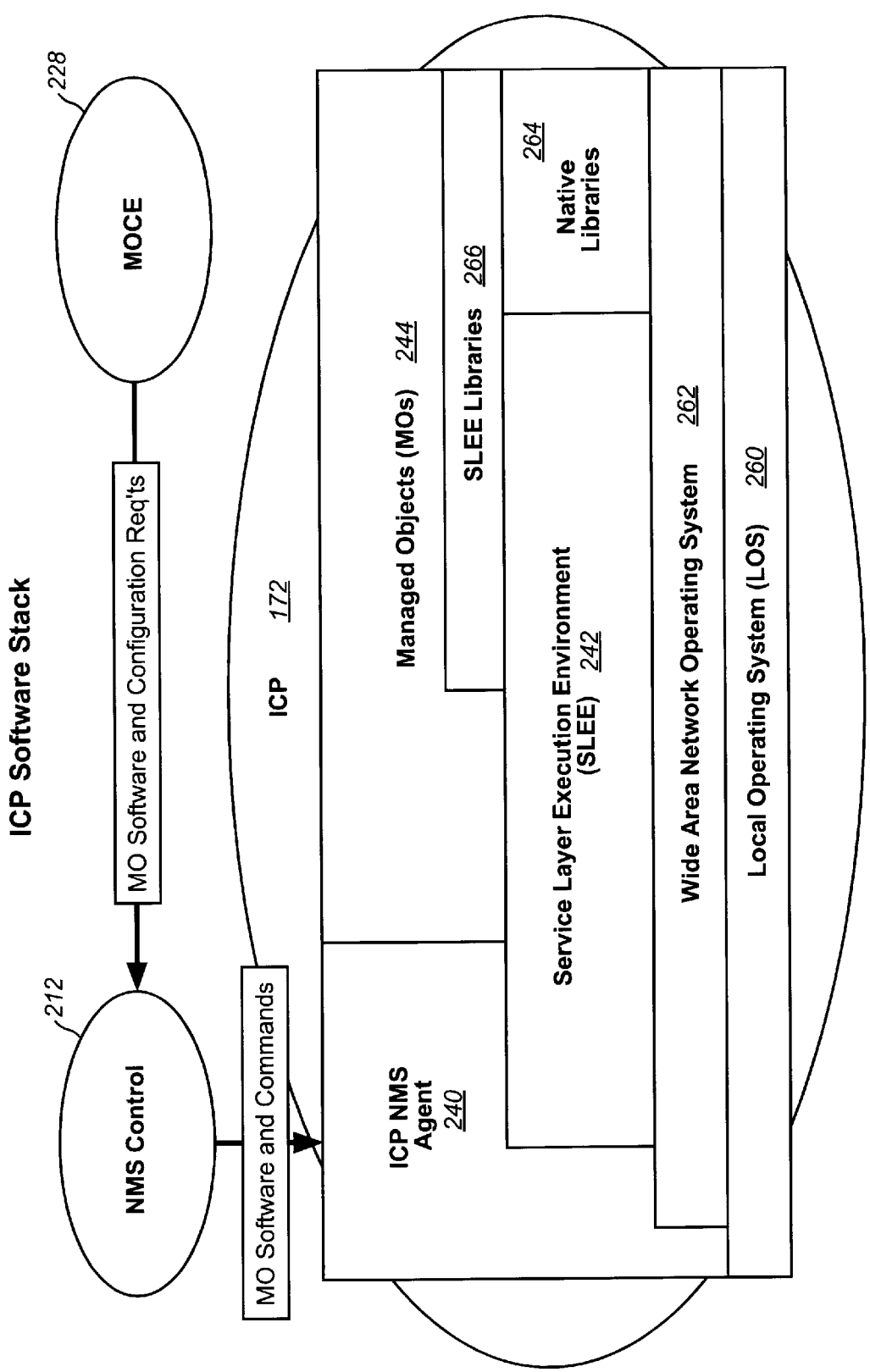
FIG. 6 is a diagram illustrating the layering of functional interfaces within an intelligent call processor in accordance with the present invention.

FIG. 6 depicts the layering of functional interfaces within the ICP 172. The MOCE 228 is the system where the managed object software and its dependencies are generated. The NMS 212 controls the execution of the ICP 172 by interfacing to an agent function provided within the ICP 172, called the ICP-NMS Agent 240. The NMS 212 controls the operation of the Local Operating System ("LOS") 260 on the ICP 172. The NMS 212 controls the operation of the ICP 172, including starting and stopping of processes, querying the contents of the process table, and the status of processes, configuring the operating system parameters, and monitoring the performance of the general purpose computer system that hosts the ICP 172.

The NMS 212 also controls the operation of the Wide Area Network Operating System ("WANOS") 262. The NMS 212 controls the initialization and operation of the WANOS support processes and the configuration of the WANOS libraries via its control of the LOS 260 and any other interfaces provided by the NMS SLEE control. The NMS 212 controls the instantiation and operation of the one or more SLEE's 242 running on an ICP 172. The LOS 260 is a commercial-off-the-shelf operating system for operation of the general purpose computer. The WANOS 262 is a commercial-off-the-shelf middle-ware software package (e.g., an object request broker) that facilitates seamless communication between computing nodes. The SLEE 242 hosts the execution of managed objects 244, which are software instances that implement the service processing architecture. The SLEE 242 implements the means to control the execution of the managed objects 244 by the ICP-NMS Agent 240. Thus, a SLEE 242 instance is a software process capable of deploying and removing managed object software, instantiating and destroying managed object instances, supporting the interaction and collaboration of managed objects, administering access to Native Libraries 264, and interfacing with the NMS-ICP Agent 240 in implementing the required controls.

The Native Libraries 264 are libraries that are coded to depend only on the LOS 260 or WANOS 262 and the native general purpose computer execution (e.g., compiled C libraries). They are used primarily to supplement the native functionality provided by the SLEE 242.

SLEE libraries 266 are libraries coded to execute in the SLEE 242. They can access the functions provided by the SLEE 242 and the Native Libraries 264. The managed objects 244 are the software loaded and executed by the SLEE 242. They can access the functionality provided by the SLEE 242 and the SLEE libraries 266 (and possibly the native libraries 264).

The ICP-NMS Agent 240 provides the NMS 212 the ability to control the operation of the ICP 172. The ICP-NMS Agent 240 implements the ability to control the operation and configuration of the LOS 260, the operation and configuration of the WANOS 262, and the instantiation and operation of SLEE(s) 242. The proposed service processing architecture operates in layers of increasing abstraction. From the perspective of the SLEE 242, however, there are only two layers: the managed object layer 244, which is the layer of objects (software instances) that are interaction under the control of the NMS 212; and the Library layer 264 or 266, which is the layer of software (either native to the SLEE 242 or the LOS 260) that supplies supplementary functions to the operation of the managed objects 242 or the SLEE 242 itself. It is, however, anticipated that at some point, the NMS 212 may relinquish control of the exact location of managed object instances. For example, managed object instances may be allowed to migrate from one node to another based on one or more algorithms or events, such as in response to demand.

It should be understood that, collectively, the LOS and WANOS functionality may be represented as a Network Operating System or "NOS", as shown in FIG. 6, that functions to provide platform independent and location independent connectivity between the IDNA/NGIN system components. That is, NOS comprises a set of network-wide services that provides process interfaces and communications among the other IDNA/NGIN functional components and sub-components. Among the services provided by NOS are object connectivity, logical name translation, inter-process communications, and local and system-wide resource management ("RM"). For instance, as shown in FIG. 4(a), the NOS component 700 provides the local (NODE RM) and system-wide resource management (SYS RM) function, as described in commonly-owned, co-pending U.S. patent application Ser. No. 09/420,654 Oct. 19, 1999 entitled METHOD AND APPARATUS FOR MANAGING LOCAL RESOURCES IN SERVICE NODES OF AN INTELLIGENT NETWORK, the contents and disclosure of which is incorporated by reference as if fully set forth herein. Particularly, the NOS component encapsulates the location of any service from the processes that need services and data, so that a process only needs to make a call to a single logical name. The NOS component then determines which instance of a service to use, and provides connectivity to that instance. The NOS 700 enables, in part, both the widely distributed nature of IDNA/NGIN, and the platform-independence of IDNA/NGIN. For example, the aforementioned logic programs use the NOS component 700 to call other logic programs, and can therefore call and invoke other logic programs that run on different SLEEs either in the same service node or a remote service node. Particularly, through the SA 500, a service node may be specified to perform only certain services. When a call that arrives at a switch having an associated service node 204 for which the needed service may not be performed, e.g., joining a conference bridge, IDNA may need to route the call to another node configured to provide such service. Preferably, IDNA, via the NOS component 700, will call the needed service at another remote service node, perform the call processing, and provide a service response to the switch at the original node.

Figure 7:
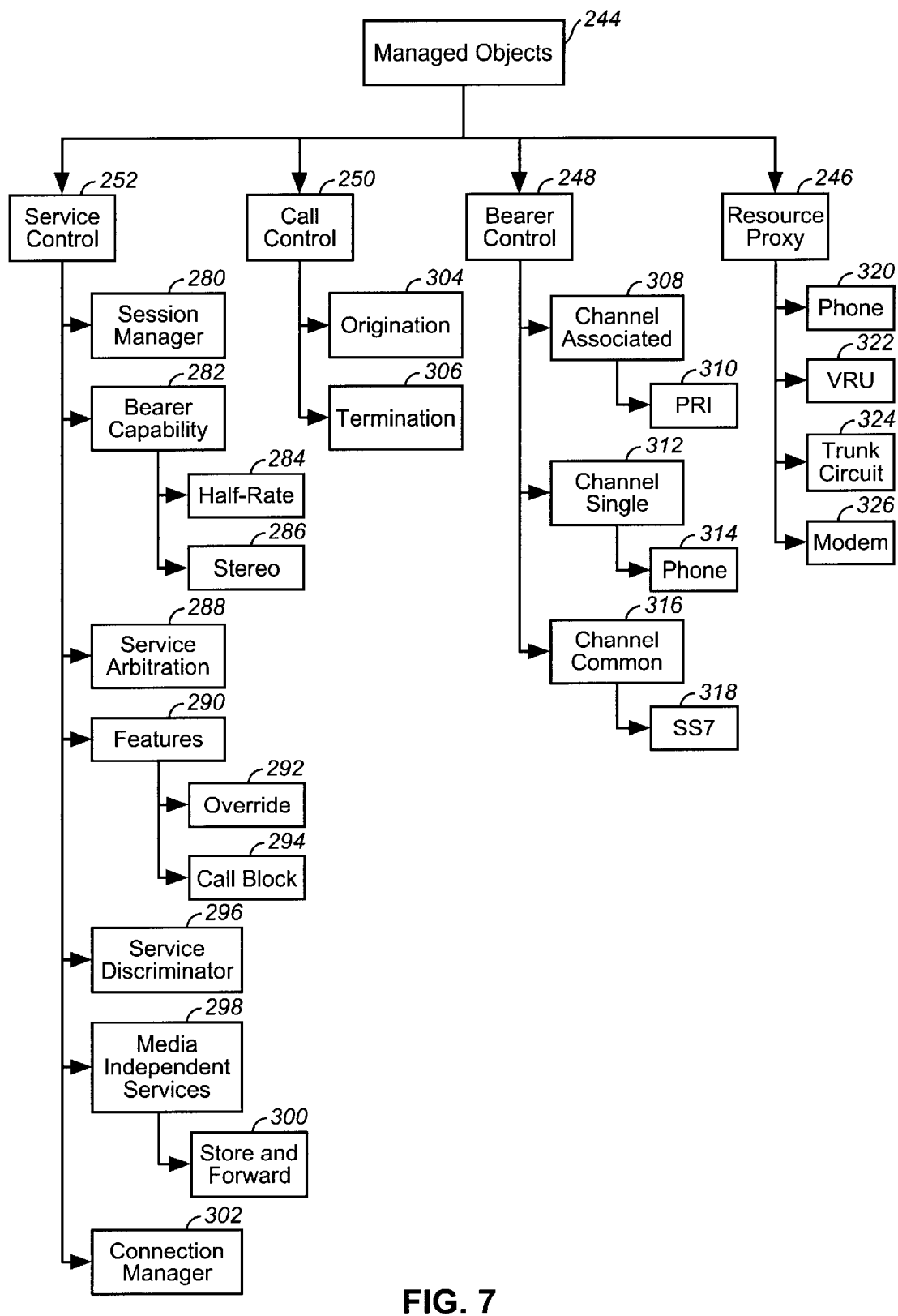
FIG. 7 is a diagram illustrating the class hierarchy of managed objects within an intelligent call processor in accordance with the present invention.

Referring now to FIG. 7, the class hierarchy of managed objects in accordance with the present invention is now described. The abstract base class managed objects 244 includes common functionality and virtual functions to assure that all derived classes can properly be supported as objects in the SLEE 242. Specifically, four distinct subclasses are shown, the service control class 252, call control class 250, bearer control class 248, and resource proxy class 246.

The service control class 252 is the base class for all service function objects. The session manager class 280 encapsulates the session-related information and activities. A session may comprise one or more calls or other invocations of network functions. The session manager class 280 provides a unique identifier for each session. If call processing is taking place in a nodal fashion, then billing information must be collated. A unique identifier for each call makes collation easy, instead of requiring costly correlation processing. In service processing, protocols are wrapped by successive layers of abstraction. Eventually, the protocol is sufficiently abstracted to warrant the allocation/instantiation of a session manager (e.g., in SS7, the receipt of an LAM message would warrant having session management).

The bearer capability class 282 changes the quality of service on a bearer. A service control class 252 can enable changes in the Quality-of-Service ("QoS") of a call or even change the bearer capability, such as moving from 56 Kbit/s to higher rates and then back down. The QoS is managed by the connection manager class 302. For example, a Half-Rate subclass 284 degrades the QoS of a call to 4 Khz sample rate, instead of the usual 8 Khz sample rate. A Stereo subclass 286 might a low a user to form two connections in a call to support left channel and right channel.

The service arbitration class 288 codifies the mediation of service conflicts and service interactions. This is required because service control classes 252 can conflict, particularly origination and termination services. For many practical reasons, it is undesirable to encode within each service control class 252 an awareness of how to resolve conflict with each other type of service control class 252. Instead, when a conflict is identified, references to the conflicting services and their pending requests are passed to the service arbitration class 288. The service arbitration class 288 may then decide the appropriate course of action, perhaps taking into account local context, configuration data, and subsequent queries to the conflicting service objects. Having a service arbitration class 288 allows explicit documentation and encoding of conflict resolution algorithms, as opposed to either hard-coded or implicit mechanisms. Moreover, when a service is updated or added, the existing services do not have to be updated to account for any conflict changes, which could require the change of multiple relationships within a single service.

The feature class 290 implements the standard set of capabilities associated with telephony (e.g., 3-way calling, call waiting). One such capability can be an override 292 to enable an origination to disconnect an existing call in order to reach an intended recipient. Another common capability can include a call block 294 whereby an origination offer can be rejected based upon a set of criteria about the origination.

The service discrimination class 296 is used to selectively invoke other services during call processing and is sub-classed as a service itself. The service discrimination class 296 provides for flexible, context-sensitive service activation and obviates the need to have fixed code within each service object for determining when to activate the service.

The activation sequence is isolated from the service itself. For example, Subscriber A and Subscriber B have access to the same set of features. Subscriber A chooses to selectively invoke one or more of his services using a particular set of signals. Subscriber B prefers to use a different set of signals to activate his services. The only difference between the subscribers is the manner in which they activate their services. So it is desirable to partition the selection process from the service itself. There are two available solutions. The service selection process for Subscribers A and B can be encoded in separate service discrimination class 296, or one service discrimination class 296 can use a profile per subscriber to indicate the appropriate information. This can be generalized to apply to more users whose service sets are disjointed. Furthermore, the use of a service discrimination class 296 can alter the mapping of access to services based upon the context or progress of a given call. The implementation of this class allows various call participants to activate different services using perhaps different activation inputs. In the prior art, all switch vendors delivered inflexible service selection schemes, which prevented this capability.

The media independent service class 298 is a type of service control class 252, such as store-and-forward 300, broadcasting, redirection, preemption, QoS, and multi-party connections, that applies to different media types including voice, fax, e-mail, and others. If a service control class 252 is developed that can be applied to each media type, then the service control class 252 can be broken into re-usable service control classes 252. If the service control class 252 is broken into media-dependent functions and a media-independent function (i.e., a media-independent SC which implements a service and a set media-dependent wrapper SC's—one per media type). As derived from the media-independent class 298, store and forward 300 provides the generic ability to store a message or data stream of some media type and then the ability to deliver it later based on some event. Redirection provides the ability to move a connection from one logical address to another based on specified conditions. This concept is the basis for call forwarding (all types), ACD/UCD, WATS (1-800 services), find-me/follow-me and mobile roaming, etc. Preemption, either negotiated or otherwise, includes services such as call waiting, priority preemption, etc. QoS modulated connections implement future services over packet networks, such as voice/fax, streaming video and file transfer. Multi-party connections include 3-way and N-way video conferencing, etc. Although user control and input is primarily implemented using the keys on a telephone, voice recognition is expected to be used for user control and input in the future.

The connection manager class 302 is responsible for coordinating and arbitrating the connections of various bearer controls 248 involved in a call. Thus, the complexity of managing the connectivity between parties in multiple calls is encapsulated and removed from all other services. Service and Call processing are decoupled from the connections. This breaks the paradigm of mapping calls to connections as one to many. Now the mapping of calls to calls is many to many.

The connection manager classes 302 within an architecture are designed to operate stand-alone or collaborate as peers. In operation, the service control classes 252 present the connection manager classes 302 with requests to add, modify and remove call segments. It is the connection manager class' 302 responsibility to accomplish these changes. Note: Since connections can be considered either as resources in and of themselves or as the attributes of resources, a connection manager class 302 can be implemented as a proxy or an aspect of basic resource management functions.

The call control class 250 implements essential call processing, such as the basic finite-state machine commonly used for telephony, and specifies how call processing is to take place. Two classes may be derived along the functional partition of origination (placing a call) 304 and termination (accepting a call) 306.

The bearer control class 248 is directed at adapting specific signals and events to and from the Resource Complex 180, via the resource proxy 246, into common signals and events that can be understood by the call control objects 250. One anticipated role of an object derived from this class is to collect information about the origination end of a call, such as subscriber line number, class of service, type of access, etc. Subclasses may be differentiated on the basis of the number of circuits or channels associated with the signaling. These may include a channel associated class 308, as applies to the single signaling channel per 23 bearer channels in an ISDN Primary Interface 310, a channel single class 312 as typified by an analog phone 314 that uses dialing to control a single circuit, and the channel common class 316, represented by SS7 signaling 318 entirely dissociated from bearer channels.

The resource proxy class 246 is devoted to interfacing the execution environment to real-world switches and other elements in the bearer network. Examples of internal states implemented at this level and inherited by all descendent classes are in-service vs. out-of-service and free vs. in use. Contemplated derived classes are phone 320 (a standard proxy for a standard 2500 set), voice responsive units ("VRUs") 322 (a standard proxy for voice response units), IMT trunk connections 324 (a standard proxy for digital trunk (T1/E1) circuits), and modem connections 326 (a standard proxy for digital modems), corresponding to specific types of resources in the Resource Complex 180. A preferred manner in which a Service Control component may serve incoming service requests, is now described with further reference to FIG. 10 which illustrates particularly another embodiment of a service control environment 430 having SLEE applications 450, 450' executing within the operating system 435 of a service control server, e.g., general purpose computer 440.

Figure 8:
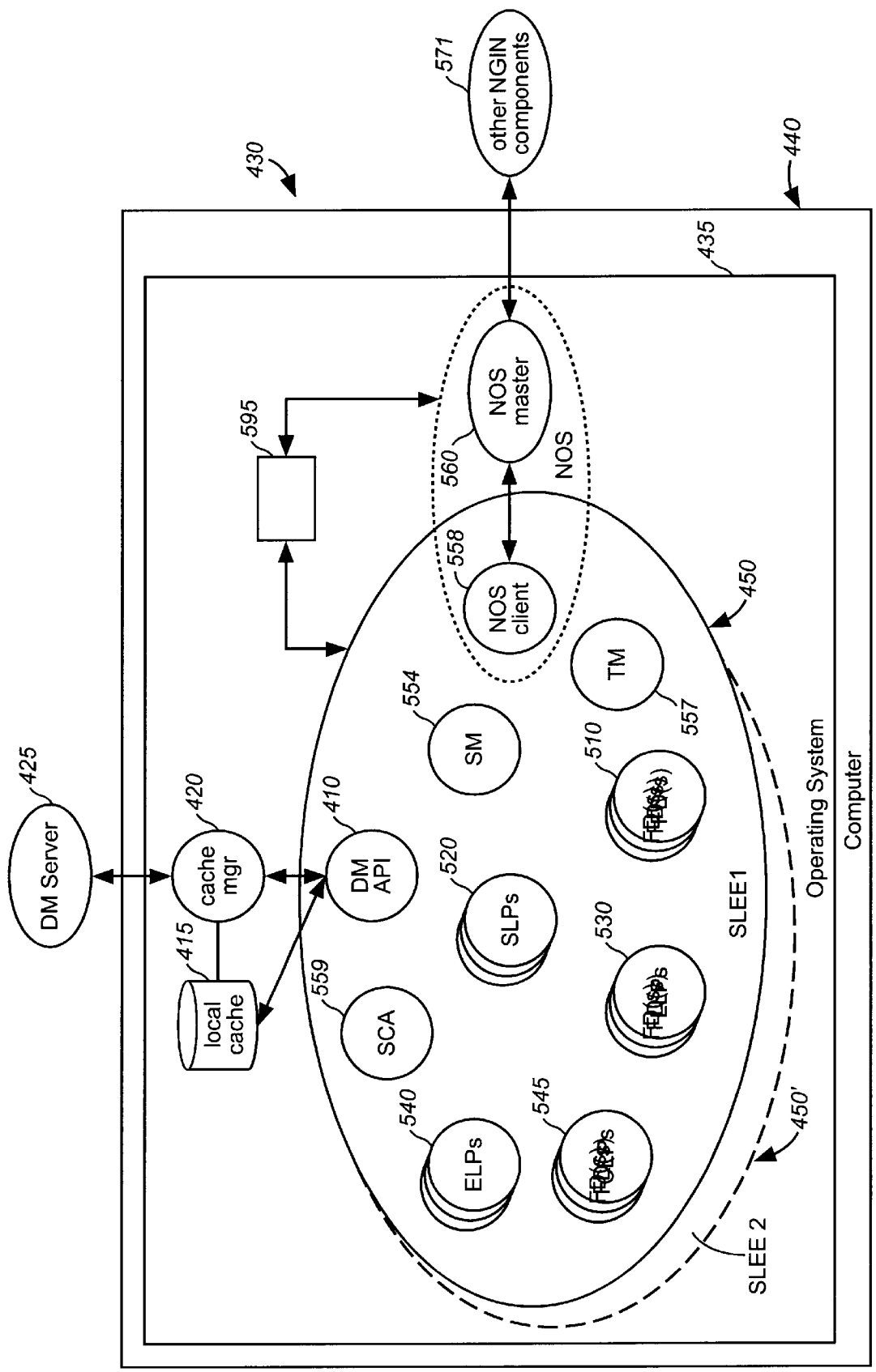
FIG. 8 illustrates a preferred architecture of a service control environment 430.

As shown in FIG. 8, the SLEE 450 is a Java™ "virtual machine" designed to execute at least five types of logic programs (objects) implemented in performing call processing services and other supporting services: 1) Feature Discriminator logic programs ("FD") 510, which are functional sub-components of the service control class/service discriminator class 296 (FIG. 7) that first receive a service request from the switching platform, determine which service to perform on a call based on some available criteria, for example, the dialed number of the call, and, then calls on another appropriate Service Logic Program to process the call; 2) the Service Logic Program ("SLP") objects 520, which are functional sub-components of the service control class 252 (FIG. 7) that perform service processing for a received service request or event; 3) Line Logic Program ("LLP") objects 530, which are functional sub-components of the call control class 250 (FIG. 7) that maintain the current state of a network access line; 4) Event Logic Program ("EL?") objects 540, which are functional sub-components of the service control/session manager class 260 (FIG. 7) to which all other logic programs write events; and 5) Call Logic Program ("CLP") objects 545 which are functional sub-components of the service control/connection manager class 302 (FIG. 7) that maintains the state of an entire call by providing a connection point for all other logic programs that are involved in the processing of a call. Each of these logic programs are embodied as a software "objects", preferably written in Java™ programming language, that may either be temporarily instantiated or persistent, as will be described. The IDNA/NGIN service control architecture is designed such that these objects are written only once in MOCE/SCE, and may be deployed to a SLEEs on any type of computer and on any type of operating system anywhere in the network.

With greater particularity, the FD 510 is a static sub-component that 1) first receives a service request from the resource complex, e.g., switch when the switch identifies that the service is to be processed by IDNA/NGIN; 2) analyzes the information associated with the service request; and, 3) determines which SLP is capable of processing the service request. Preferably, the FD may be a system task or an instantiated object for receiving data provided from the resource complex including, but not limited to, the called number, the calling number, the originating switch ID, originating trunk group, the originating line information, and the network call ID. Through NOS, the FD 510 initiates the instantiation of the appropriate SLP, the CLP and the originating LLP to process the call. Preferably, the FD 510 is a persistent object, not being tied to a particular call or event, and runs actively in the Service Control SLEE 450 at all times. Depending upon the complexity of the analysis performed, and the volume of the requests to FD, there may be one or more instances of a FD running actively in a Service Control SLEE 450 in order to share the load and guarantee real time efficiency. For instance, one FD may be used to analyze received SS7 message data, while another FD may be used to analyze ATM message data.

The Line Logic Program (LLP) 530 is the functional sub-component that: 1) maintains the current state of a network access point, connection, or line; 2) queries Data Management for features associated with the physical point, connection, or line; and, 3) applies those features, such as call interrupt, call waiting, call forwarding, and overflow routing as the call situation demands. There is an LLP associated with a line that originates a call, hereinafter "LLPO", and an LLP associated with a point connection, or line to which a call terminates, hereinafter "LLPT". Once a Line Logic Program instance is instantiated, it registers itself with the switch fabric. As will be described, the Line Logic Program 530 sends all event data to the ELP sub-component of the same instance of service processing.

Dynamic Sub-Components are those components that are dynamically constructed according to different stages of service processing and which are destructed when an instance of service processing is complete and including: Event Logic Programs (ELP); Call Logic Programs (CLP); and, Service Logic Programs (SLP).

The Event Logic Program (ELP) 540 is the functional sub-component used to keep the real-time event data that is generated during service processing and records all event data that occurs during execution of a service. The Event Logic Program preferably, is instantiated by the call control process at the switch when an event is first received. When the switch sends a service request to NGIN, it passes along the address of the ELP so that event data may be sent to this logic program tied to that call. The Event Logic Program is accessible to all the sub-components within the same instance of the service processing, i.e., the CLP, LLPs and SLP that pertain to the call. As each service processing component processes that call in the performance of a service, it writes event data to the ELP, through NOS, according to pre-established rules. When a call is completed, the event data in the ELP is written to a data store or log from which the event data is then compiled into billing records and sent to downstream systems for billing, traffic/usage reporting, and other back-office functions. Particularly, the ELP performs the function of: 1) gathering the network events generated by a specific call; 2) formatting the events into appropriate call history records, e.g., call detail records ("CDRs"), billing data records ("BDRs"), switch event records, etc.; and 3) verifying, validating and storing the information, e.g., in data management, for future transmission to a downstream system, e.g., customer billing. It should be understood that the rules for determining which events get written to the ELP is established at Service Creation. Event data is additionally accessible by fraud management and network management systems.

The Call Logic Program (CLP) 545 is the functional sub-component that maintains the state of each SLP involved in service processing, and provides process interfaces among all services (LP's). In one embodiment, a CLP is instantiated by the FD when an event service request is first received for a call, or, may be instantiated by a call control component located at the switch. Alternatively, the CLP 545 may be instantiated by an SLP 510 at some point during service processing, in accordance with a trigger point programmed into the SLP; in this way, the instantiation of a CLP may be specific to a service. The Call Logic Program receives the address of all the sub-components within the same instance of the service processing at the time of instantiation, i.e. the SLPs, LLPs and ELP. The CLP then associates the SLP(s), LLPO, LLPT and ELP for that call and is accessible by all of these sub-components within the same instance of the service processing. That is, the Call Logic Program is the connection point for communication between the SLPs and the LLPs involved in the same instance of service processing. When a call is completed, the CLP notifies all of the sub-components within the same instance of service processing of the call completion which will initiate the tear down process of the logic programs.

Figure 11A:
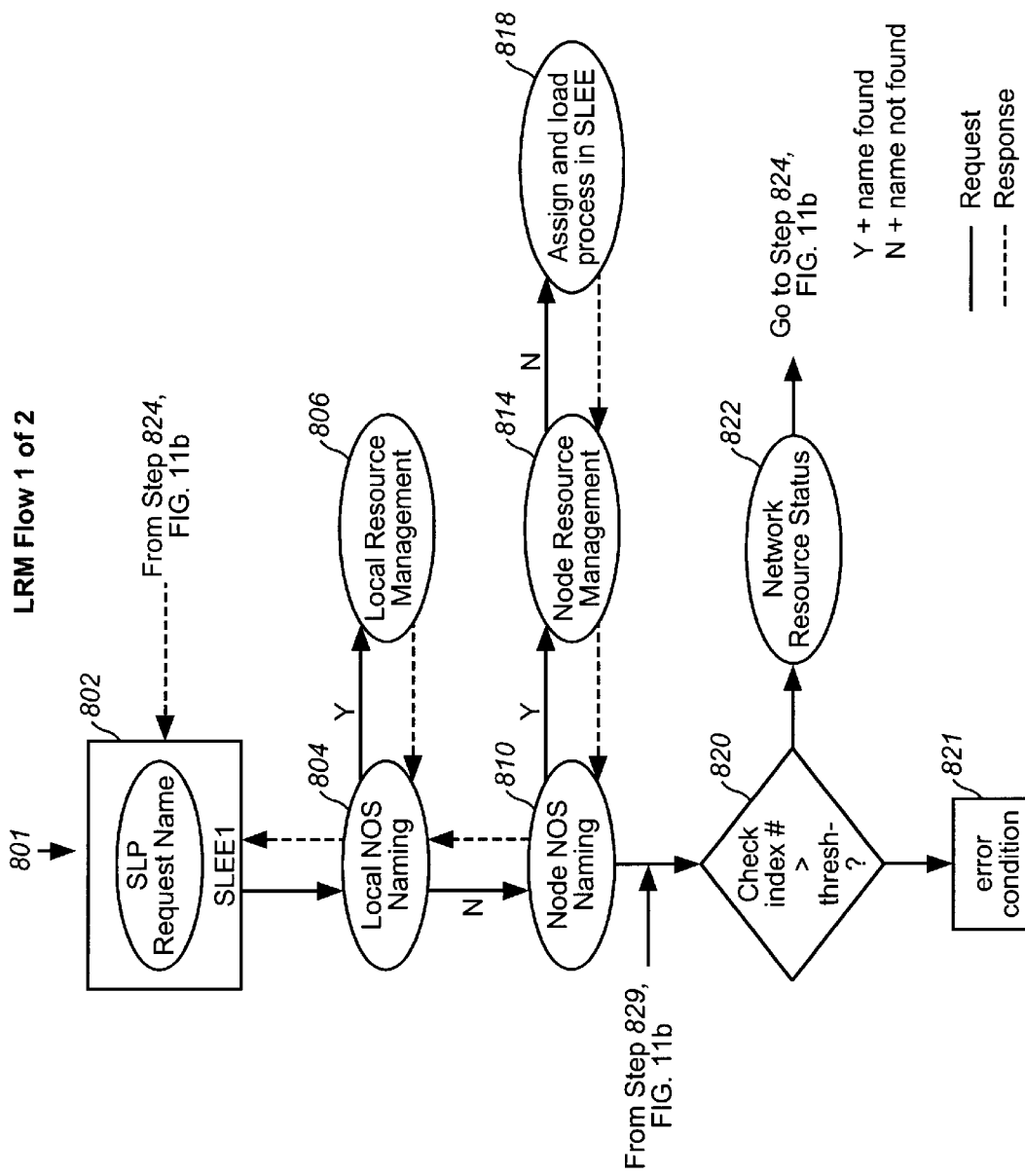
FIGS. 11(a) and 11(b) depict the three-tiered intelligent network resource management functionality.
Figure 11B:
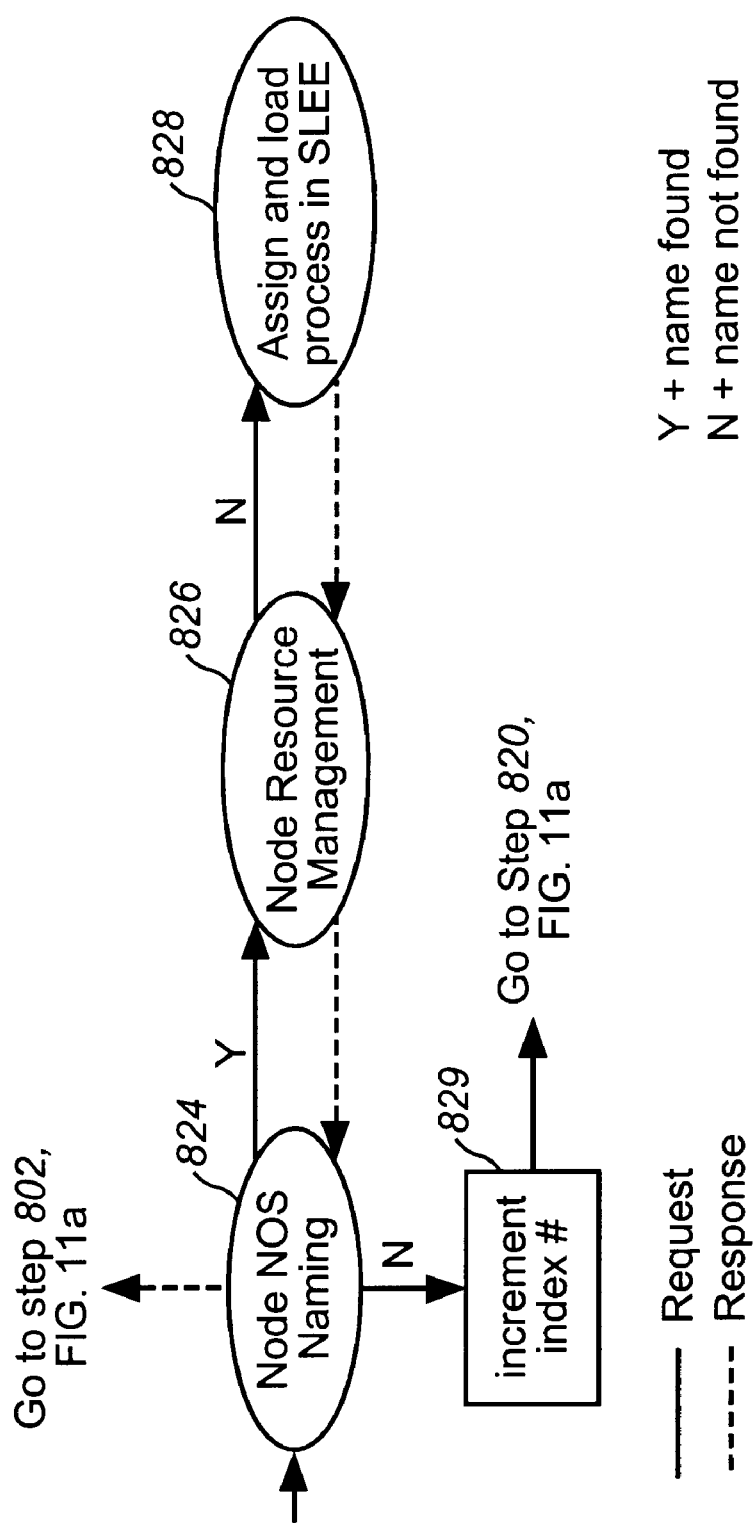

The Service Logic Program (SLP) 520 is the dynamic sub-component providing the logic required to execute a service. An SLP is tied to a service, rather than a call, and performs services, and features contained therein, for a call. The features that an SLP may apply for a service, include, for example, call routing algorithms and IVR services. The SLP may be a persistent object for frequently used services, or it may be instantiated when demanded by the FD and killed upon call completion, e.g., for infrequently used services. Whether a certain SLP is active at all times, at some times, or only on-demand, is determined by the configuration file 580 generated by Service Administration for that service as shown in FIG. 11. Preferably, the SLP has access to the CLP and ELP sub-components within the same instance of service processing.

Not all SLPs are related to a specific call service and some SLPs are available for tasks that are needed by, and called by, other SLPs. Thus, for example, an SLP for an 800 service may need to invoke an SLP for a Line Information Database query to complete its tasks for call routing translations. An SLP can also pass control of call processing for a call to another SLP. Preferably, only one controlling SLP shall be executing at a time for a single instance of service processing. Any event data that is generated as part of the service task performed by the SLP is sent to the ELP component 540 within the same instance of service processing.

An SLP may not be executed in an operating system directly because it does not contain all the information for a operating system to execute. Moreover, if the SLP needs to be executed in different operating systems without changing the format and content, NOS middle-ware between the SLP and the operating system is provided to maintain the consistency of the SLP across operating systems.

Figure 4C:
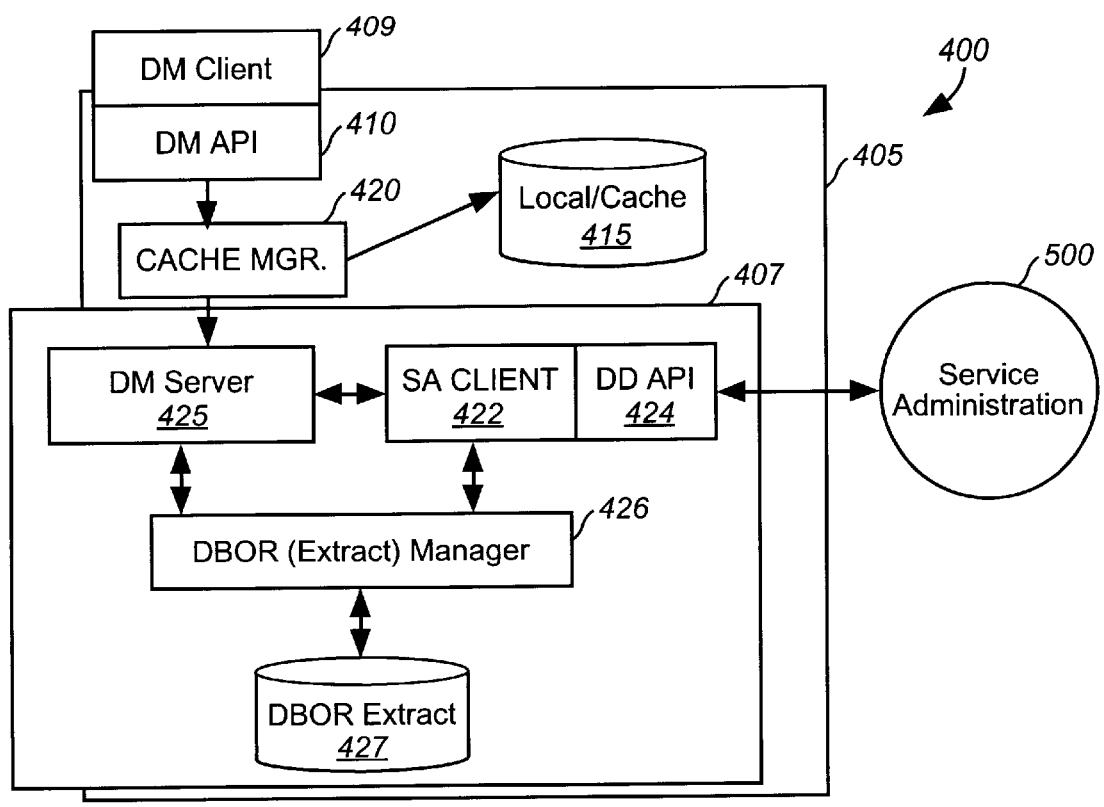
FIG. 4(c) illustrates the functional architecture of the Data Management component 400.

As further shown in FIG. 8, other processes that execute within the SLEE 450 for support and operational functions include: a Service Manager ("SM") object 554, responsible for loading, activating, de-activating and removing services that run in the SLEE and, further monitoring all other services running within its SLEE, and reporting status and utilization data to NOS; a NOS client process 558 which is a NOS class library that is used for interfacing with NOS services and is used by all services running within that SLEE to call on NOS services, i.e., is the gateway to NOS; a thread manager ("TM") 557, which provides functionality needed for NGIN services to execute concurrently without tying up all the SLEE resources; and, a Data Management API ("DM API") 410 used to interface with the local cache 415 and cache manager components of DM 400 as will be described herein with reference to FIG. 4(c).

Still other service instances loaded in the SLEE as shown in FIG. 8 include a service agent ("Sag") instance 559 and a thread manager instance 557 associated therewith which are utilized for service activation at service nodes, as will be described in further detail herein.

Figure 12A:
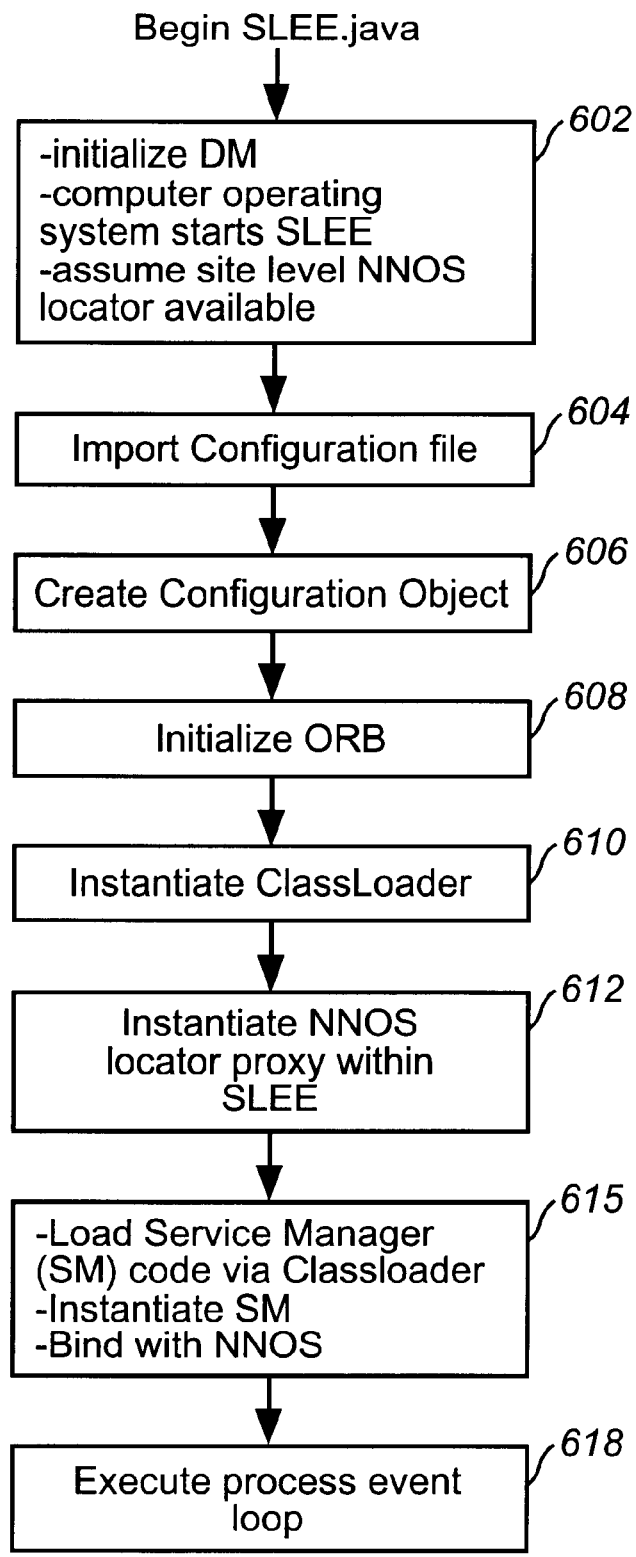
FIG. 12(a) illustrates the SLEE start-up process.

FIG. 12(a) illustrates the (SLEE.java) process steps providing the main entry point into the SLEE process. As shown in FIG. 12(a), step 602 it is assumed that a DM system component is available, a NOS site locator system including a NOS client process 558 and NOS master process 560 (FIG. 11) which provides a NOS class library that is used for interfacing with NOS services and is used by all services running within the SLEE to call on NOS services is available for receiving logical name and object reference registrations and, that the service control server operating system, e.g., Windows NT, UNIX, PC, etc., may start the SLEE process, e.g., by recognizing a bootstrap call such as main( ) or fork( ). It should be understood that the NOS master component 560 (FIG. 8) interfaces directly with the computer's operating system, the NOS client process 558, and other system components 571. Preferably, there is a NOS master process 560 located on the network or the local node that interfaces with the NOS client object 558 on each SLEE and includes all NOS class libraries for providing NOS services. Next, at step 604, the service control configuration file and parses the file to build a configuration object may include a hashtable containing key-value pairs as indicated at step 606. The SLEE accepts two parameters: a name and a configuration file. The name parameter is a unique NGIN name string that is used by the NOS Locator service for identifying this instance of SLEE, i.e., is used by the SLEE to register itself with the NGIN Locator service (step 612), and the configuration file is used by the Locator service for finding its site locator. For example, this table may be used to find SLEE configuration properties. As NOS implements CORBA, the base CORBA functionality is next initialized at step 608. Next, at step 610, a SLEEClassloader class is instantiated and a NOS locator proxy service is instantiated within the SLEE as indicated at step 612. Next, as indicated at step 615, the Service Manager (SM) class is loaded via a Classloader class, instantiated, and binded with the local NOS, i.e., the SM object is registered with the local proxy NOS locator service object. It should be understood that the local locator service propagates the Service Manager registration to other locator services in the NGIN domain. As will be explained with reference to FIG. 12(b), after the Service Manager object is registered with the locator service, it is capable of processing service management requests for loading, activating, de-activating and removing services to/from the SLEE. Finally, as indicated at step 618, a process event loop is executed which is the SLEE thread that keeps the SLEE running and allows the SLEE to process NOS events as they come in through the Service Manager ("SM") or Service Agent ("SAg") objects as will be explained in greater detail herein.

Figure 12B:
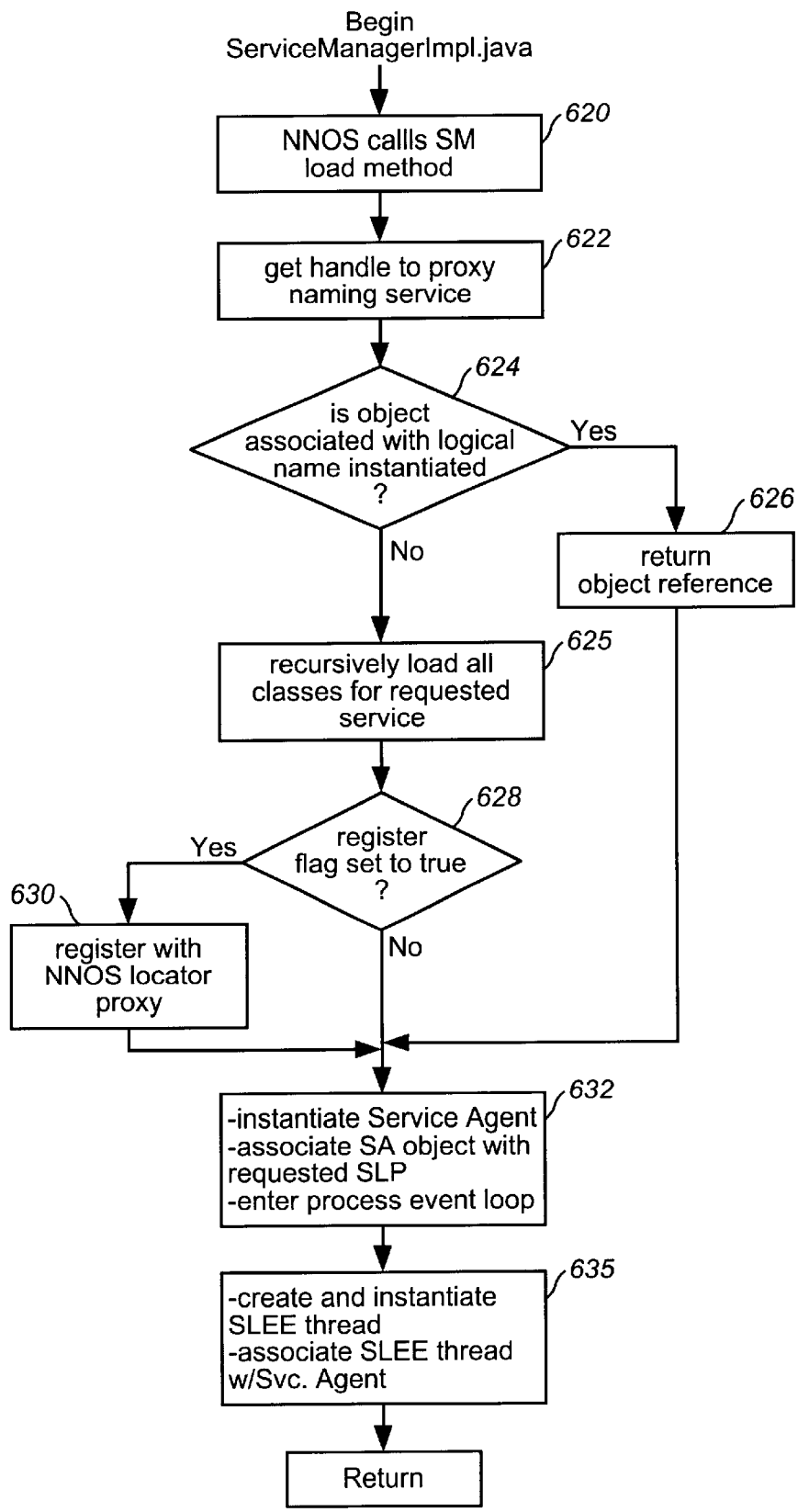
FIG. 12(b) illustrates the Service Manager process.

FIG. 12(b) illustrates the (ServiceManagerImpl.java) process steps carried out by the service manager object instance 554 (FIG. 8) instantiated as discussed above with reference to FIG. 12(a), step 615. Preferably, the SM object implements an ORB interface for performing service management operations on behalf of NOS. The process illustrates the steps taken by the SM instance to load, activate, deactivate, run and terminate services within the SLEE, e.g., via (load), (run) (start) and (stop) methods. The parameters passed in to the SM object instance by NOS include the logical reference of the service desired and boolean flag indicating whether NOS should register the service with the NGIN Local Resource Manager(LRM) site locator or whether the service is responsible for registering itself with NOS. As indicated at step 620, a request to load a service is first received, and, a handle is made to the proxy naming service at step 622. Then, at step 624, a decision is made as to whether the requested service, e.g., 1-800 collect ("18C"), is already loaded, ie., if the object embodying the requested service is instantiated. If the object for the requested service is already instantiated, then NOS will return that service's object reference to locate the physical object instance at step 626 and the process returns to step 632. If the service object for the requested service, e.g., 18C, is not already instantiated, then the Classloader class is instantiated at step 625 which implements recursive loading to load all classes that the requested service depends on, including other SLPs and SIBBs. The recursive loading is possible by referring to a local configuration file from the local cache, for instance. Particularly, a flag is passed in which indicates whether classloader is to recursively load in all these dependent classes into the JVM. When loading classes for a service in the first instance, it is understood that a generic Service Agent class may be loaded if it already is not. Then, after loading in all the classes at step 625, a boolean register flag is checked at step 628 to determine whether the service has to register itself with the local NOS naming service (proxy). If the boolean register flag has been set, e.g., to true, then the service has responsibility to register with the NOS naming service, as indicated at step 630. Otherwise, the process continues to step 632 where the SAg class is instantiated, and an association is made between the service agent object instance 558 (FIG. 11) and the particular service, i.e., by passing in the SLP object into service agent instance. Then, at step 635 a new SLEE thread is created, in the manner as to be described, and the SLEE thread is invoked to run the Service Agent, i.e., associate the SLEE thread with the Service Agent. Finally, the SM process is exited and the process returns to SLEE.java process. Via the methods provided in SM, the additionally is responsible for monitoring all other services running within its SLEE, and reporting status and utilization data to NOS.

Figure 12C:
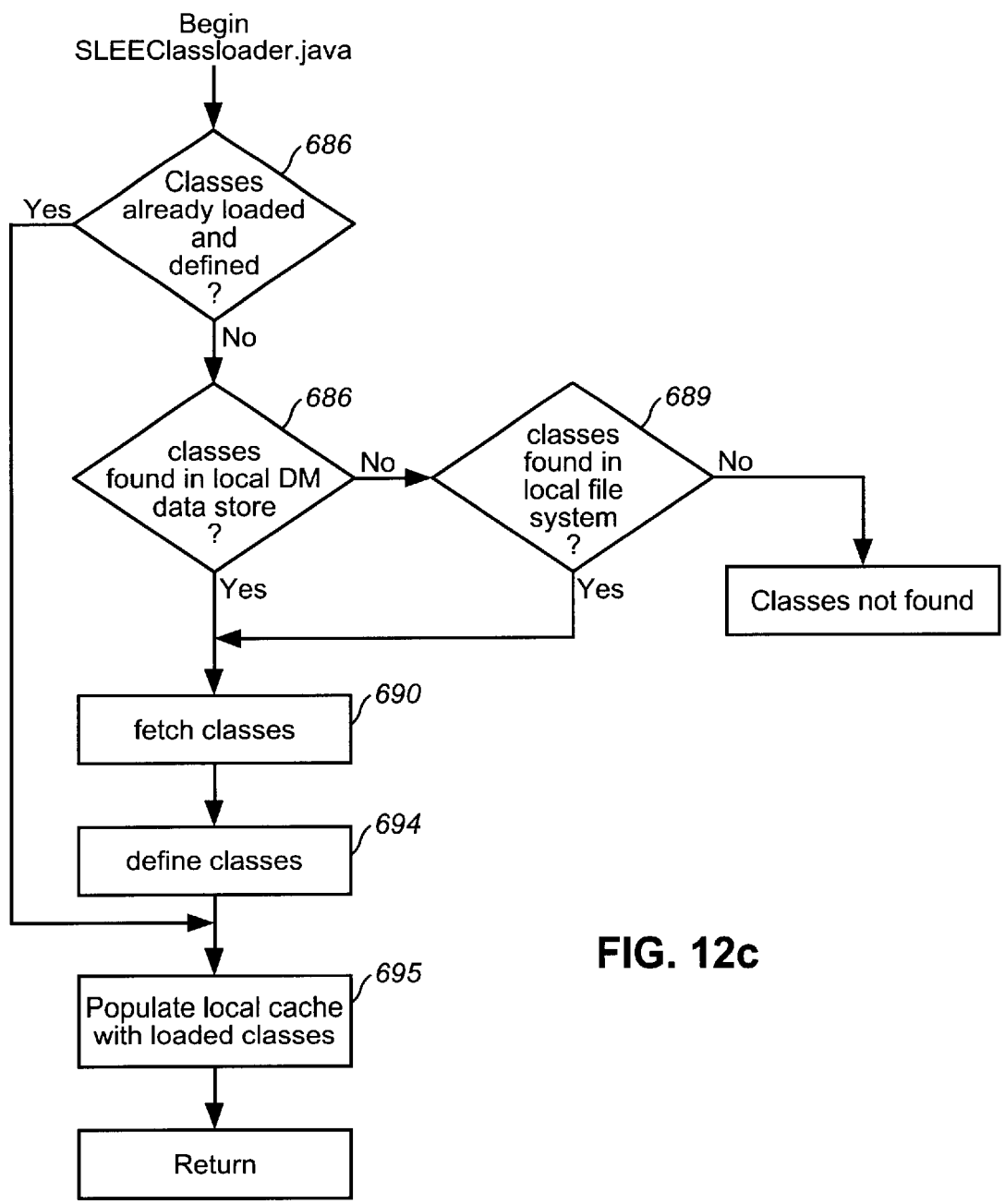
FIG. 12(c) illustrates the SLEE Classloader process.
Figure 12D:
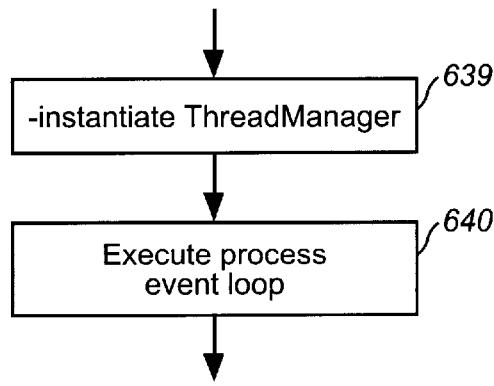
FIGS. 12(d) and 12(e) illustrate flow charts depicting the Service Agent functionality.

Further to the SM process, the invocation of (SLEEClassLoader.java) is now described in greater detail in view of FIG. 12(c). Particularly, the SLEEClassLoader class is a specialized class of and extends the JVM's ClassLoader class. It extends the behavior of the system class loader by allowing classes to be loaded over the network. Thus, as a first step 686 of FIG. 12(*c*), the classloader first checks its local cache associated with the instance of the SLEE to see if the class has been already loaded and defined. If the class has already been loaded, then the process returns. If the class has not been loaded, then at step 688, a message is sent via NCS to check a local data store (DM) if the class is available for loading. For example, the SLEEClassLoader may retrieve classes from a relational database using JDBC database connectivity, however, it is understood that it may retrieve classes from any relational database that supports the JDBC API. If the service class is not found in the local data store, then the SLEEclassloader checks a local file system at step 689. If the class is found in either the data store, or, local file system, the class is fetched, as indicated at step 690. Then, at step 694, a define class method is invoked to make that class available for the JVM execution environment. Particularly, the (defineClass) method may recursively go through each of the classes specified for performing that service and converts an array of bytes into an instance of class Class. Instances of this newly defined class may then be created using the newInstance method in class Class. This functionality allows the SLEE to load and instantiate new services and yet remain generic. Preferably, as indicated at step 695, a method is called to populate the local cache so the next time the class is loaded there will be a cache hit.

In the preferred embodiment, each of these instantiated objects registers themselves with a NOS locator service, i.e., LRM 577, in accordance with a naming convention, generally exemplified by the following string:

. . . site level. SLEE Number. SLP name . . .

where the site level is the information pertaining to the physical location of the NGIN service control server 440; the SLEE Number is the particular SLEE in which that object has been instantiated, e.g., SLEE#1; and the SLP name is the logical name of the service, e.g., Feature Discriminator#1. The string may include a "version number," as well. A registration name is propagated to other locator sites in the NGIN domain; and it is by this registration process and the NOS resource management functionality (to be described) by which the NOS component knows which processes have been deployed, where they have been deployed, and where services may be currently available.

The methods and constructors of objects created by a class loader may reference other classes. To determine the class(es) referred to, the Java Virtual Machine calls the loadClass method of the class loader that originally created the class. If the Java Virtual Machine only needs to determine if the class exists and if it does exist to know its superclass, a "resolve" flag is set to false. However, if an instance of the class is being created or any of its methods are being called, the class must also be resolved. In this case the resolve flag is set to true, and the resolveClass method is called. This functionality guarantees that the classes/SIBBs/JavaBeans which are referred by the service will also be resolved by the SLEEClassLoader.

FIG. 12(*d*) illustrates the service agent class process flow upon instantiation. As shown at step 639, the first step includes instantiation of a thread manager ("TM") object associated with the service agent and depicted as TM object instance 557 in FIG. 11. As will be described, the thread manager object is based on a (ThreadManager) class which may be instantiated to behave like a thread factory functioning to create a new SLEE thread per service request, or a thread warehouse, which is desired when running on machines with high thread creation latencies. Next, at step 640, the SA associated with the service enters into a process event loop via its (run) class method, and is now ready for receiving call events associated with a service.

Referring to FIG. 12(*e*), there is illustrated the details of the ServiceAgent class which provides the gateway into the NGIN services via its (begin), (continue) and (end) class methods. Every service within the SLEE has an associated ServiceAgent object which is based on a class responsible for managing service instances (call instances) and dispatching events to service instances. As shown in FIG. 12(*e*), after a SAg object is instantiated by the Service Manager (load) method and is running, the SAg's (begin) method is invoked each time a new call requesting that service is received. Particularly, as indicated in FIG. 12(*e*), at step 641, tid, orid call identifier parameters and a message stream containing event information related to service processing for that call, e.g., as provided by an Initial Address Message ("IAM") from the IDNA/NGIN switch referred to herein as the Next Generation Switch ("NGS") , is first passed into the SAg begin method. Then, at step 643, the message stream is decoded, e.g., by invoking a (decode) method to extract the critical information related to that service instance. Additionally, a call context object instance used for managing call context data is created to receive the extracted message information. In the begin method, as indicated at step 645, a new thread is allocated for that call by invoking the allocate method of the ThreadManager instance, as described herein with reference to FIG. 12(*g*), or, a thread is pulled from a pool of threads if several threads for that service have been instantiated ahead of time. Otherwise, if the SAg (continue) method is invoked, an object reference corresponding to the allocated thread for that call is returned.

With greater particularly, the thread manager object is based on the ThreadManager class which preferably manages threads based on session ids. Two methods, (allocate) and (release) are provided for allocating and releasing threads, respectively. Both allocate and release expect a unique identifier as a key that can be used for thread identification. The unique identifiers include a transaction ID ("Tid") which is set by the NGS switch which received the call, and an object reference ID ("Orid") identifying the call originator and are used to identify a call instance. FIG. 12(*f*) illustrates the operational details of the (allocate) method of the thread manager class. As shown in FIG. 12(*f*), at step 660, the Tid and Orid identifiers for uniquely identifying the call transaction are passed in the process and a unique key is generated based on the identifiers. Then, at step 662, a query is made as to whether the key identifies an already existing thread, for example, by checking a hashtable of key-value pairs. If the key is recognized meaning that a service thread has already been allocated for the call, then at step 664, the thread manager will return the SleeThread instance (thread object) after consulting the hashtable. Otherwise, at step 663 a counter which tracks number of instantiated service threads is incremented, and in an effort to monitor system loads, at step 665, a determination is made as to whether the maximum value of thread instances for that service has exceeded. If the maximum value of thread instances for that service has been exceeded, e.g., upon comparison of the counter value with the maximum service instance value found in the service configuration file, then at step 667 a message is issued to NOS to enable it to seek out another instance for the service which may be available, for example, in another SLEE executing at the same site, or, at instantiated at another service node location, for example, and the process returns. Further to the SleeThread instantiation process is the initialization of its PriorityEventQueue, as will De described in further detail herein with reference to FIG. 12(g). If the maximum value of thread instances for that service has not been exceeded, then at step 668, a determination is made as to whether a threshold value of thread instances for that service has exceeded. If a threshold value of thread instances for that service has been exceeded, then at step 669, a warning is issued to NOS local resource management function that the service threshold has been reached. Finally, at step 670, regardless of the output at step 668, a new SleeThread instance for the requested service is allocated, a priority event queue is initialized for that requested service and the thread is started with control being returned to the SAg instance for that service.

Figure 12E:
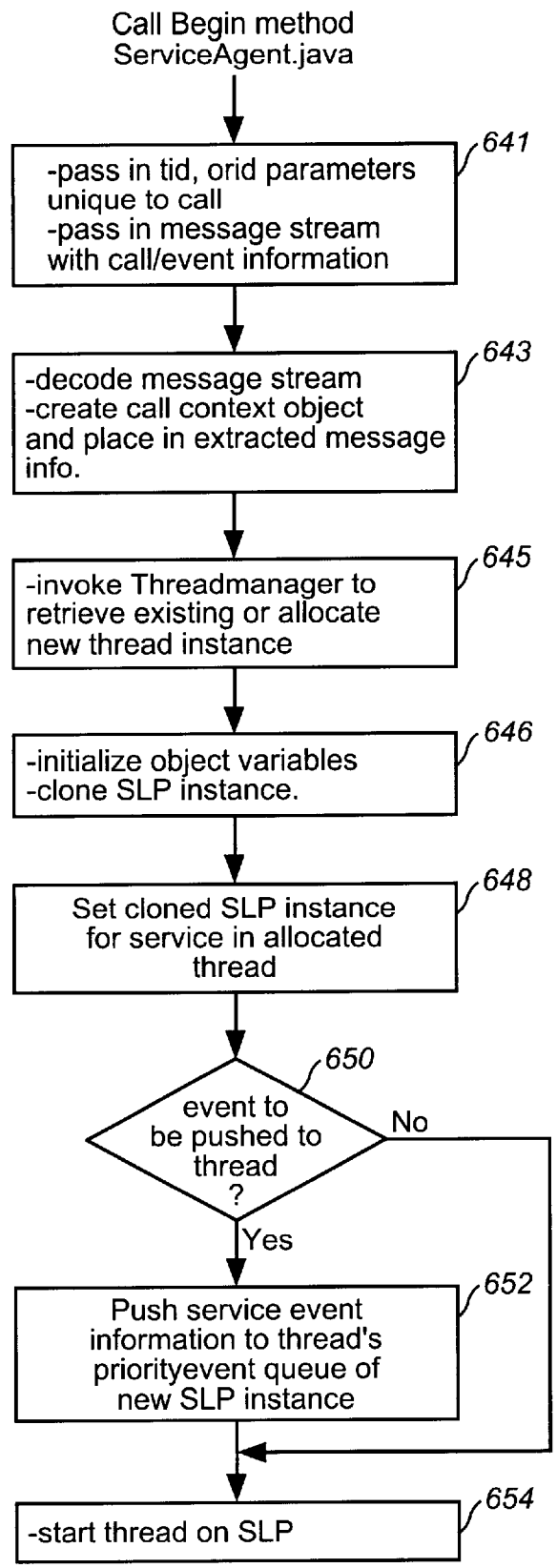
Figure 12F:
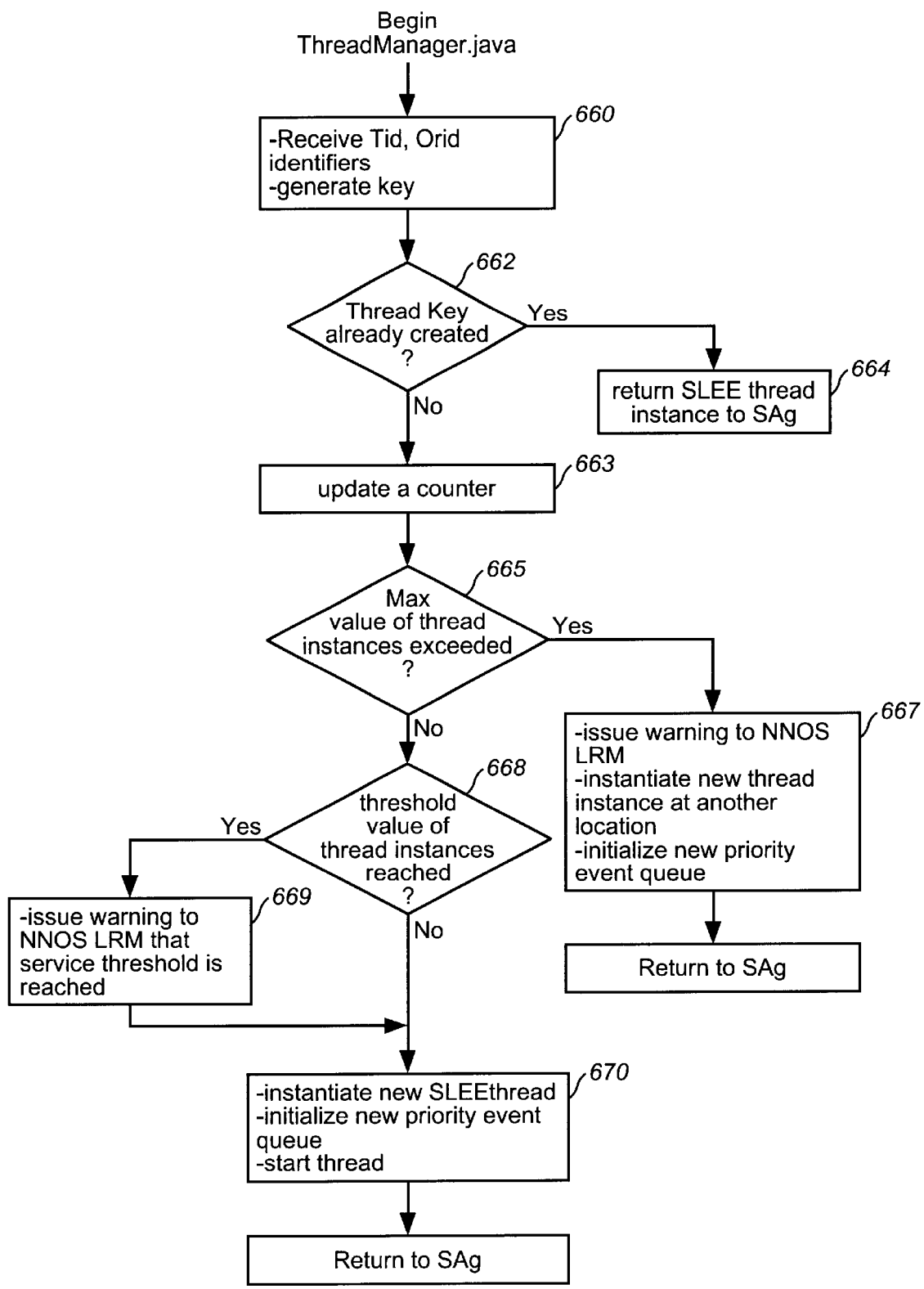
FIG. 12(f) illustrates the Thread Manager process.

Returning back to the Service Agent (begin) method functionality as shown in FIG. 12(e), after the thread manager has allocated the thread for the service instance, object variables relating to the thread are initialized at step 646, and a new object instance of the requested service is instantiated by invoking a (clone) method. Then, at step 648, the new cloned SLP instance is set into the new allocated thread. Then, at step 650, a decision is made as to whether there is event information that is needed to be associated with that call instance, e.g., all the IAM information that had been extracted from the input message stream. If there is event information associated with the new cloned SLP instance, then this it is pushed onto the thread as indicated at step 652. Whether there is event information to be pushed onto the thread or not, the new allocated thread for that SLP is started, waiting for the asynchronous arrival of service-related event information which is processed by the SA (continue) method. As mentioned, the SleeThread allocated for that call maintains a priority event queue for holding all service related event information received during processing. All events related to service processing has an associated priority and the thread will manage processing of event information according to its priority, i.e., its placement in that service's event queue. Finally, at step 654, the thread event loop is started for that call instance.

It should be understood that the SA (continue) method is essentially the same as the (begin) method shown in FIG. 12(e), with the difference being that SA (continue) method is directed to channeling real-time service-related events with a service process thread that has already been instantiated for that call instance, as discussed above with reference to FIG. 12(e). Thus, the Service Agent's continue method receives events and identification parameters of the call instance, re-allocates the service thread associated with the tid, orid parameters for the received event, and pushes the event to the thread's event priority queue. It should be understood that both the SAg and SM classes both comprises an IDL interface to NOS. Services (SLPs) do not have such an interface however, are able to communicate system wide with via its SAg interface. During real-time service processing, the SLEE 450 is able to perform the following: 1) interpret instructions at SLP and SIBB levels during service processing; 2) deliver the incoming events to the designated instance of the SLP; 3) generate trace data if a tracing flag is set; 4) allow tracing turned on at SLP, SIBB, and SLEE levels and send the trace data to a specified output; 5) generate SLEE usage data and send the run time usage data to a specified output; 6) generate the exceptional data (errors) for telecommunications management network (TMN) interface; 7) generate performance data for TMN interface; 8) receive a message/request for adding new instances of SLP or utility programs and add such new SLP or utility program instances without interrupting and degrading the service processing; and 9) support the same service by multiple Service Control instances for load sharing.

When a service instance has finished processing, it will either initiate the termination of the service or, another process in communication with the service will. In either event, the SAg (end) method is called which functions to terminate the thread instance associated with that call. This is accomplished by invoking a ThreadManager (release) method, passing in the Tid and Crid identifiers uniquely identifying the call instance, pushing any events onto the thread's event queue, and releasing the call, i.e., terminating the thread instance and/or placing the thread instance back into a thread pool.

Preferably, the SleeThread class instance provides the functionality needed for IDNA/NGIN services to execute concurrently without tying up all the SLEE resources and, facilitates co-operative resource sharing. Specifically, there is a one-to-one mapping between SleeThread and a service instance with the SLEE associating one instance of a SleeThread with one instance of a service, i.e., for every call that is handled by a service there is one instant of SleeThread associated with the call. The SleeThread also acts like a data warehouse for the services by housing a transaction id (tid), object reference id (orid), object references, e.g., both peer and agents, an SLP, and the priority event queue associated with the SLP. More particularly, a SleeThread acts like an event channel between the service(SLP) and the Service-Agent by implementing two key interfaces: a PushConsumer for enabling the ServiceAgent to push events on the SleeThread; and, a PullSupplier enabling services to pull events from their associated thread. As will be described, every SleeThread has a instance of PriorityEventQueue for queuing NGINEvents, in the manner described.

Preferably, the (PriorityEventQueue) class is a platform-independent class that queues events (derived classes of NGINEvent) associated with a service (SLP). As shown with reference to steps 667, 670, FIG. 12(f), every SleeThread object instantiates an instance of PriorityEventQueue which may comprise a hashtable of events. The events may be queued in descending order, for example, with event priorities being defined in the NGINEvent base class and ranging anywhere from 10 to 1, with 10 being the highest priority, for example. Thus, each thread may track the number of events that are/not available for processing, thus enabling full service processing parallelism.

Figure 12G:
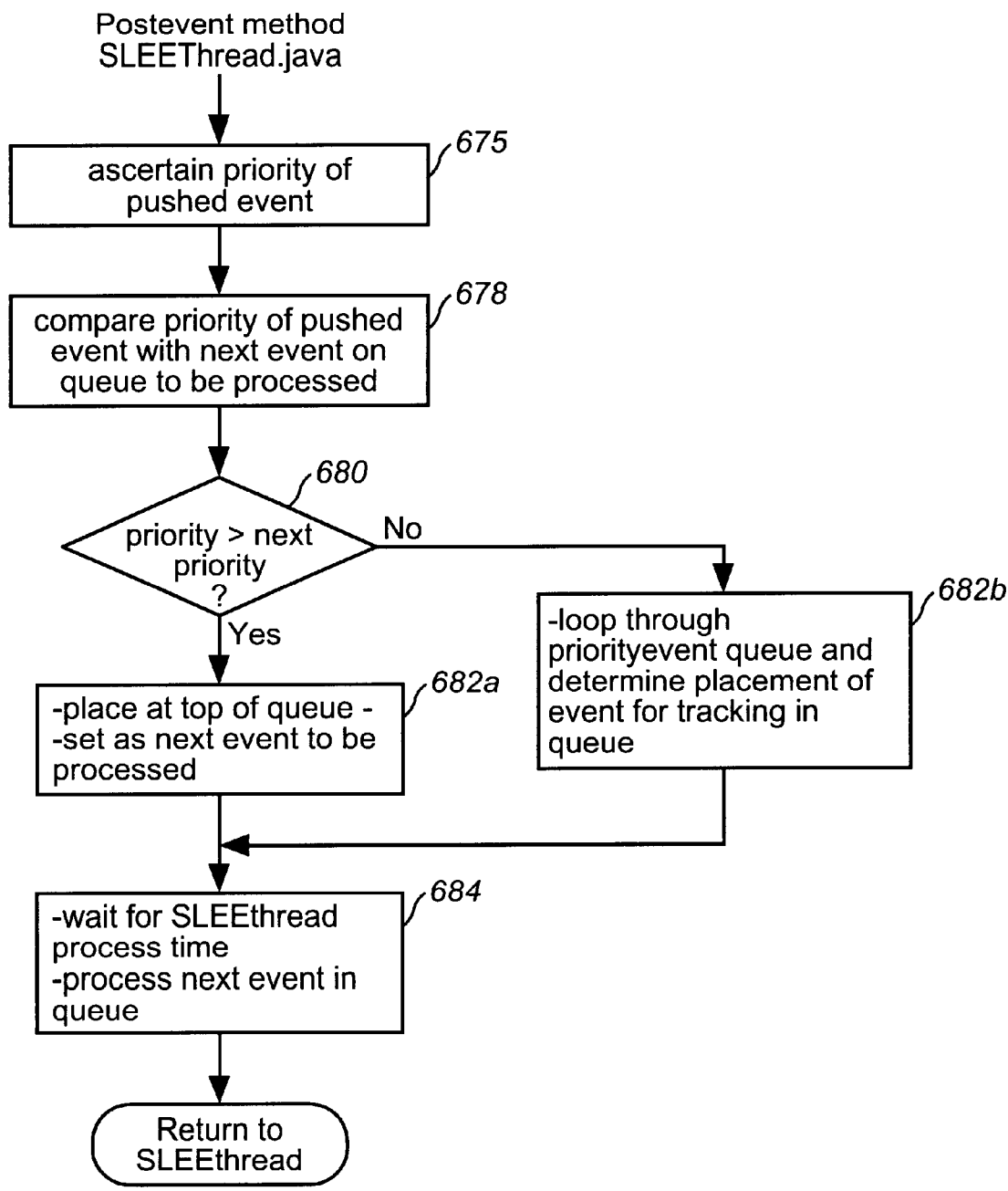
FIG. 12(g) illustrates the Service agent post-event process.

FIG. 12(g) illustrates a (postEvent) method which encapsulates logic for ascertaining the priority of the event being received by the thread, as indicated at step 675, and the posting of events to the PriorityEventQueue. As shown in FIG. 12(g), this is essentially accomplished by comparing the priority of pushed event with the priority of the next event on priority queue to be processed at step 678, determining if the priority of the pushed event is greater than the priority of the next event in the queue to be processed (if any) at step 680, and, either placing the pushed event at the top of the queue to set it as the next event to be processed as indicated at step 682a, or, looping through the queue and determining the location in the queue where the event should be stored according to its priority, as indicated at step 682b. Then, at step 684, the SleeThread processes the next event of highest priority when it is allocated processing time from the system.

More particularly, a PullSupplier interface is implemented by the SleeThread to support an operation for consumers to request data from suppliers by invoking either a "pull" operation which blocks until the event data is available or an exception is raised and returns the event data to the consumer, or, the "tryPull" operation which does not block. That is, if the event data is available, it returns the event data and sets a hasEvent parameter to true; if the event is not available, it sets the hasEvent parameter to false and a null value is returned. Thus, the SleeThread may act as the event supplier and the service (SLP) takes on the consumer role. The service (SLP) uses the SleeThread pull or tryPull for fetching event data from the SleeThread. The service either uses the pull operation if it cannot continue without the event data, otherwise, it uses the tryPull operation.

The PushConsumer interface is implemented by SleeThread and implements a generic PushConsumer interface which supports operation for suppliers to communicate event data to the consumer by invoking the push operation onto the thread and passing the event data as a parameter into that thread's priority event queue. Thus, the SleeThread acts as the event consumer and the ServiceAgent take on the supplier role. The ServiceAgent uses the SleeThread push operation for communicating event data to the SleeThread. A "kill" service event may comprise the highest priority. Priorities for events may be defaulted, or, when newly created event classes are designed, may be established at Service Creation.

As described, the Service Agent instance for a particular service channels all events received and generated during the course of service processing to/from the service thread instance created for that call. For example, an initial event generated by the switch at a node may comprise a (ServiceRequestEvent) which class is responsible for conveying an initial service request to the IDNA/NGIN service control and particularly, the pertinent initial call context information such as: the time that the service request is initiated; the Switch ID that the request is originated from; the Port ID that the call is originated; the terminal equipment ID that the call is originated; the calling party's number; the called party's number, etc. A (connectEvent) subclass extending NGINevent may report on the time that the connection occurs; the station number that the calling number is connected to; and, in the context of an ATM-VNET service, report on the incoming Virtual Path ID and outgoing Virtual Path IDs. A (releaseEvent) subclass extending NGINevent may report on the release event. For example, in the context of an ATM-VNET service, the release can be caused when the calling or called party terminates the call, or when user credit is run out. Such a class may implement SIBBS for determining: the time a release event is generated; the cause of the generating the release event and the elapsed time from connection of the calling and called parties to the time the release event is generated. Further to this, a (terminateEvent) subclass extending NGINevent may used to convey a termination message from NGIN to NGS. Upon receiving this message, the swatch may initiate tear down connection process. A (MonitorReleaseEvent) subclass extends NGINEvent and is used to send a message to NGS directing NGS to forward a release indication to NGIN upon receipt of a release indication. When NGS receives a monitor release message, a (UniNotifyEvent) sub-class may be invoked sending a notification to the originator (caller). The (MonitorConnectEvent) sub-class extends NGINEvent and is a subclass used to send a message from NGIN to NTGS directing NGS to send an event to NGIN when a connect message is received.

As mentioned, in the context of real-time service processing, the Data Management's data retrieval and update functionality includes the ability to access data stored by DM during service processing.

In the preferred embodiment, at any particular service node, DM receives data requests from an executing managed object instance in the SLEE, e.g., through the NOS, during service processing. Data Management specifically notifies the requester (e.g., managed object) if it is unable to understand the data request. If the data request is for the retrieval of a data entity, Data Management returns the requested data to the requester (e.g., via NOS). It should be understood that any support that is needed for manipulating and querying data in a single repository or across multiple repositories is provided by DM. Data Management additionally supports the collection and collation of the results of queries that span multiple repositories. If DM is unable to locate the name of the requested entity in the data retrieval request, DM notifies the NOS component. The NOS component will also be notified if a database failure occurs during the retrieval of a data entity. Data Management additionally notifies the requester (executing service control object) of the inability to retrieve a specific data entity from a valid name. If the data request is for an update of a data entity, Data Management updates the data entity and determines if replication is required. The DM notifies the requester if it is unable to update a data entity specified in a data request, and additionally notifies NOS if it is unable to locate the name of the requested entity in the data update request. At any time during NGIN operation, DM notifies the NOS of a database failure during the update of a data entity. If the data request is for the deletion of a data entity, DM deletes the data item and determines if the transaction needs to be initiated on other repositories.

FIG. 4(c) illustrates generally, the functional architecture of the Data Management component 400 which comprises: a service control server component 405 for making the call service data available at the service node for real-time call processing; and, a database component 407, embodied as a discrete database server, for storing and distributing the selected subset of data maintained by SA. Specifically, the service control server component 405 includes a Data Management (DM) Client 409, which is the actual data management application; a DM API 410 which is linked with the DM application and is the interface the DM application uses to obtain data from SA; local cache 415 which is a shared memory on a service control server used to store some or all data from the DBOR Extract available for call processing in accordance with a local caching strategy, and a Cache Manager 420, which maintains the state of the local cache by implementing a local caching strategy and, communicates with the DM server to retrieve data from the DBOR extract. The database component 407 includes a DBOR Extract 427 which comprises one or more databases having data to be used by managed object instances during service execution at that node; a DBOR Extract Manager 426 for managing a selected subset of the information that SA holds; an SA client 422, which inputs data received from service administration to the DBOR Extract Manager 426; a DDAPI 424 that is the process interface between the SA client 422 and the data distribution process of SA; and, a data management server 425, that generally handles data extracts from the DBOR Extract Manager 426.

The data management operation will now be described in further detail with respect to FIGS. 4(c) and 8. Within a SLEE, several types of functions may need data from Data Management 400 including, but not limited to managed objects (SIBBs, SLPs, etc.) and NOS. Each of these is represented in FIG. 4(c) as a DM Client, which executes in the service control SLEE. A DM Client 410 uses the DM API 412 to make a request for data as the DM API 412 provides a common message set for all DM Clients to interface with Data Management. The DM API 412 also encapsulates from the DM Client the specific location where the data is needed, as this data may be stored in a Local Cache 415 or only in the DBOR Extract 427. The DM Client 410 requests data by a logical name, and the DM API 412 determines if that data can be retrieved from the local cache or, if it needs to request the data from the DBOR extract via the DM Server. Preferably, the local cache 415 is a shared cache available for every process running on each SLEE provided in the control server 405, i.e., there may be one or more local caches provided for different applications, e.g., 1-800 process cache, routing manager cache, etc., with each shared cache having its own respective cache manager.

When a DM Client 410 makes a request for data, the DM API first checks the local cache 415 to see if the requested data is stored there. If the requested data is stored in the local cache 415, the DM API retrieves the requested data and provides it to the DM Client 410 using any standard data retrieval technique, such as hashing keys and algorithms, or indexed sequential access methods.

If the requested data is not stored in the local cache 415 the associated Cache Manager 420 retrieves the data from the DBOR Extract 427, via the DM Server 425. Particularly, the DM API 412 notifies the Cache Manager 420 that it needs certain data and the Cache Manager responds by sending a request to the DM Server 425. The DM Server 425, in turn, retrieves the requested data from the DBOR Extract, using the DBOR Extract Manager 426 for database access. The DM Server 425 sends the requested data back to the Cache Manager 420, and the Cache Manager provides the data to the DM Client 610 via the DM API 412. The Cache Manager may also write the requested data to the local cache 415, depending upon the local caching strategy which is dependent on both service demands and on the capabilities of the computers they run on, notably the memory capacity. These specifications are obtained from the service and computer profiles generated by Service Administration. Preferably, as described in co-pending U.S. patent application Ser. No. 09/921,590 filed Oct. 20, 1999, the data cache manager component for the DM 400 of IDNA/NGIN employs a 'Client Side Caching' strategy at each service node.

The IDNA/NGIN Network Operating System ("NOS") component 700 will now be explained in greater detail in view of FIGS. 8–10. As mentioned, NOS functions include enablement of inter-process communications, object connectivity, and local and network-wide resource management functions for the IDNA/NGIN system 170. Because all NGIN processes execute on a variety of hardware and operating system platforms in a widely distributed architecture, NOS provides platform-independent and location-independent communications among all processes. Particularly, NOS comprises several functional sub-components to provide the interface between all NGIN processes, including the interfaces between Service Control, Service Administration, and Data Management. The NOS is also the interface between switch call control and service control (FIG. 5), and, enables two or more processes running on the same SLEE to communicate with each other.

Figure 9:
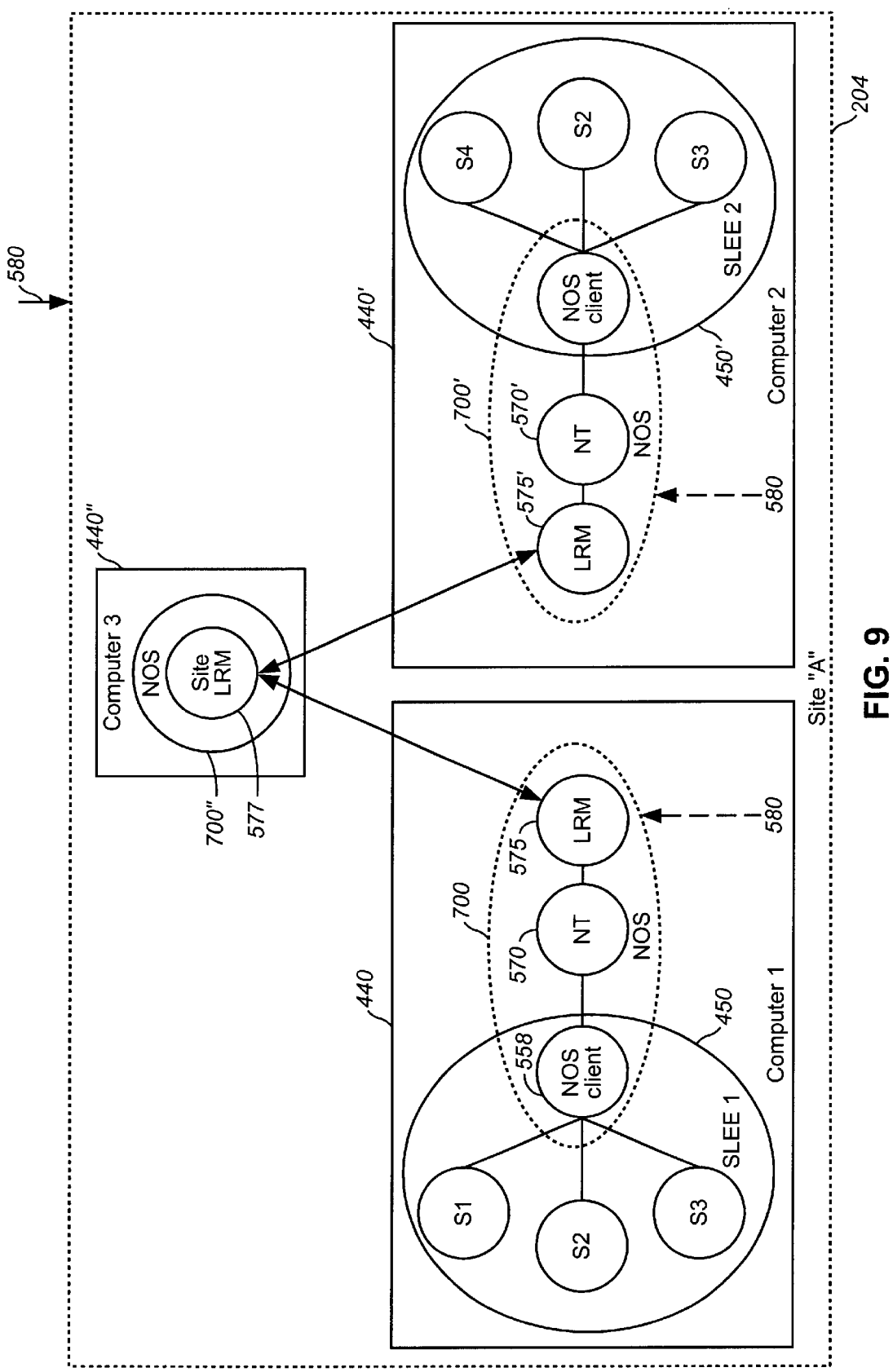
FIG. 9 illustrates the functional architecture of the NOS NT and LRM functional sub-components.
Figure 10:
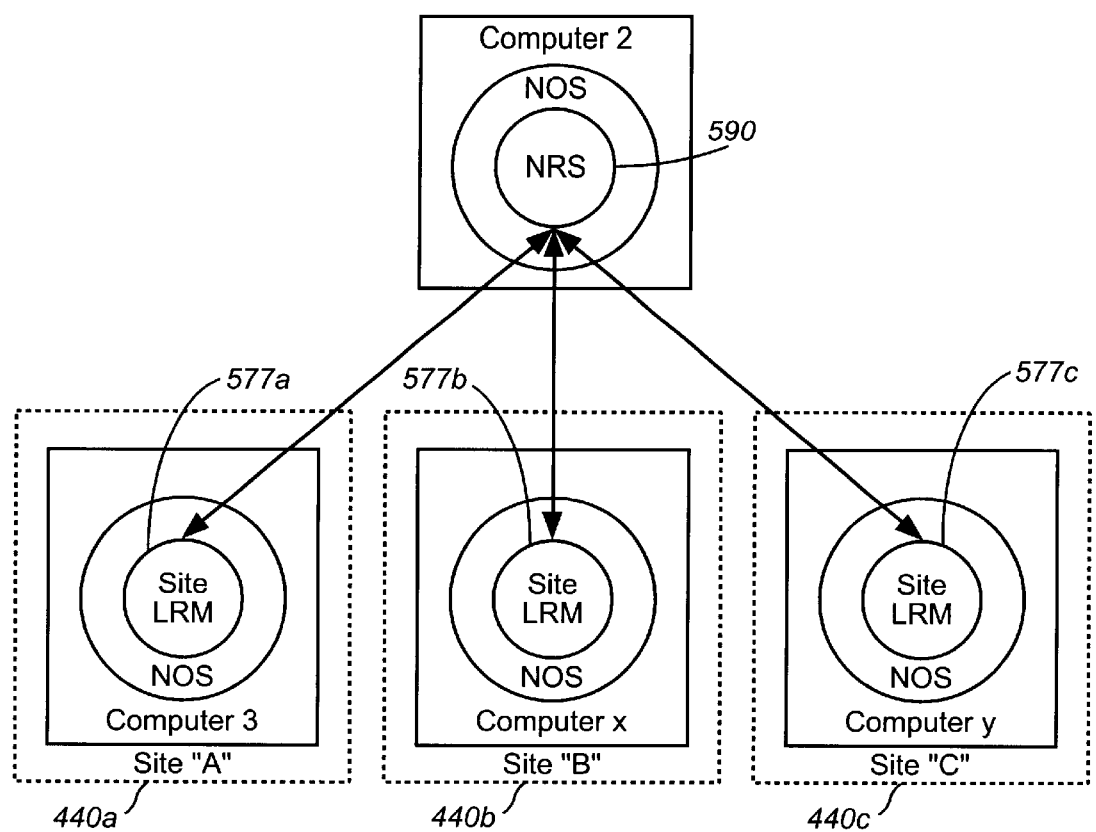
FIG. 10 illustrates the architecture of the resource management system for the intelligent network.

As shown in FIGS. 8–10 the NOS functional sub-components include: 1) a Name Translation ("NT") process 570 that resolves logical names for data and service objects to physical addresses that identifies both the computer (as a network address) and the memory address in which the requested object is running; 2) Local Resource Management ("LRM") processes 575, 577 that tracks and maintains the status of resources executing at the SLEE and at a service node; 3) a global Network Resource Status ("NRS") process 590 as shown and described in greater detail in commonly-owned, co-pending U.S. patent application Ser. No. 09/420,655 filed Oct. 19, 1999, entitled METHOD AND APPARATUS FOR MANAGING RESOURCES IN AN INTELLIGENT NETWORK, the contents and disclosure of which is incorporated by reference as if fully set forth herein, that maintains the status of all service node resources throughout the entire NGIN network and, to provide inter-process communications; 4) a set of services for providing object connectivity, such as that provided by a Common Object Request Broker Architecture (CORBA)-compliant ORB, which enables communications among objects across different computer platforms, API message sets, and Internet Protocol (IP) communications in a manner such as to meet or exceed certain real-time call processing performance requirements. For example, the typical response time for processing a typical 1-800-number "collect call" event, should be approximately 50 to 100 msec.

As described herein, the NOS component 700 may be implemented using a CORBA-compliant ORB for object connectivity such as provided by Orbix®, developed by IONA Technologies of Cambridge, Mass., and Dublin, Ireland. An ORB provides communications among objects across different computer platforms, by providing a name service which enables a mapping of logical names to physical addresses.

At system boot, the SLEE 450 is started and launches within its environment an instance of a NOS client component 558 and Service Manager process component 554. The SM SLP 554 retrieves the logical name for other components from the configuration file 580 comprising the logical names of services to be immediately instantiated. It then provides the logical name to the ORB name service, which maps that logical name to a physical address. The ORB maintains service object connectivity from that point on. The ORB name service is also used for other services' registrations. Each service started on a SLEE registers itself with NOS and it is through these registrations the ORB identifies physical addresses for logical names.

To implement platform independent communications among interactive objects, interfaces are defined, as enabled by an interface definition language ("IDL"). CORBA currently supports IDL, however other object-oriented communication technologies such as remote method invocation (RMI) protocol may be implemented as long as performance requirements are met for real-time call processing. Particularly, the interfaces for each of the NGIN components are defined at the time of their creation and are made available at run-time by storing them in a persistent data store or library (not shown) associated with the local LRM 575, such as shown in FIG. 9. Services are enabled to query this library to learn about new object interfaces. The NOS client process 558 and NOS master 560 (FIG. 8) is a NOS class library that is used for interfacing with NOS services and is used by all services running within that SLEE to call on NOS NT and LRM services, as will be described in further detail herein.

Referring now to FIG. 9, there is illustrated the functional architecture of NOS NT functional sub-component 570 and LRM functional sub-component 575 residing on a computer executing one or more SLEEs 450 and 450', with an NT and LRM sub-component associated with each SLEE. FIG. 9 particularly depicts an example of a single NGIN service node or "site" 45 having at least two computing systems 440 and 440' implementing respective SLEE components 450 and 450' and respective NOS components 700 and 700' that each include a respective NT functional sub-component 570 and 570', and a respective LRM functional sub-component 575 and 575'. Although a single SLEE is shown executing on a separate computer, it should be understood that two or more SLEEs can operate on the same computer at a single site. Running on each SLEE 450, 450' are several service objects or processes labeled S1, . . . , S4 which may be an SLP, LLP, CLP, ELP, a persistently running FD logic program and NOS client object 558, or other process.

As described herein, each NOS NT functional subcomponent 570, 570' includes a process for identifying the correct version of a data or service object to use, and the optimal instance of that object to use, particularly by allowing a process to call on any other process, using a single, common logical name that remains unchanged throughout different versions and instances of the called process. Thus, the NOS NT component 570 encapsulates object references, versioning, and physical locations of instances from processes.

As described herein, each Local Resource Manager ("LRM") component 575, 575' of NOS 700 at each service node determines which services to execute on which SLEEs at a node, per configuration rules contained in service profile (configuration) files 580, which may include the contents or the service profile deployed from SA for storage in the local LRM cache. The LRM first reads this service profile file 580 stored in the local cache at that node, and determines which specific SLEE to run a service on in accordance with the rules in the service profile file and, which services are to run actively (as persistent objects) in the SLEE, or are to be instantiated only on-demand.

In the preferred embodiment, the LRM 575 enables run-time configuration and optimization of service execution, by tracking the health and status of each Service Control resource. Particularly, each LRM functional subcomponent maintains a list of all services that are programmed to run on that SLEE, which service processes (object references) are actively running on a SLEE, and the current load status (processing capacity) of the SLEE(s) at that node based on predetermined thresholds.

More particularly, the SLEE (server) LRM component 575 is a set of libraries built into a local cache of object references corresponding to every object (logic program) in the system, and which object reference contains the Information about the server, such as IP address and port number, to enable communication. When new objects become available within the system, they are registered with NOS, i.e., an object reference is created for them for registration in the local cache through data management.

After querying its service profile (configuration) file 580 to determine which services are to be immediately instantiated, the NOS LRM component 575 sends a service activation request from NOS NT 570 to the active Service Manager object 554 in SLEE via the NOS client instance 558 also executing in the SLEE 450. The SM object 554 is an API object for enabling control of SLEE services. For example, it provides the capability to instantiate new services when a request for an inactive service is received. That is, it is capable of assigning a process thread to the object when it is instantiated and the service then registers itself with NOS via LRM 575. As a service is called by another service, using its logical name, the LRM uses the rules in the configuration file to determine which instance to invoke by utilizing the ORB name service to map the logical name to physical addresses of active instances.

As shown in FIG. 9, associated with an NGIN site or service node 45, is a site LRM 577 running over a NOS component 700" on a separate computer 440", or on a shared computer, such as computer 440 or computer 440'. The Site LRM 577 functions to: 1) track the availability of services at each SLEE, which is a function of current loads of all processes running on each SLEE; and, 2) maintain a resource status list that is an actively updated copy of each individual SLEE LRM 575, with the addition of a SLEE identifier for each resource. The site LRM sub-component 577 determines which instance of a requested service should be used based on any of several criteria, including, but not limited to: 1) the proximity of a called service instance to the calling service instance (same versus different SLEE, same versus different site); 2) the proximity of the called service instance to the Data Management data that is needed by the called service; and, 3) the current system and process loads.

As an example, illustrated in FIG. 9, whenever a process, for example, S1 in SLEE 1, needs to instantiate an SLP, S4, to perform a particular process, e.g., Vnet service, NOS first makes a determination as to whether the service, i.e., its object reference, is available in the local cache, for example, in SLEE 1. If the local LRM 575 does not have the requested object reference, NOS seeks out the site level LRM 577 to determine the location of that particular object reference corresponding to the requested service. For instance, as shown in FIG. 9, that object may be found in SLEE 2, and when found, NOS will make available that service by instantiating an instance of that object, if SLEE to has the capacity for doing so, i.e., its utilization threshold has not been reached.

As further shown in FIG. 10, in addition to a respective LRM 575 for each SLEE and LRM 577 for each site, the NOS component 700 further includes a Network Resource Status ("NRS") sub-component 590 which is a process that performs a network-wide resource management function. Particularly, the NRS includes a subset of data maintained by each site LRM, for every Site LRM in the network, for example, site LRMs 577a, . . . ,577c corresponding to respective sites 440a–440c in FIG. 10. The NRS 590 includes: 1) a list of SLEEs; 2) which types of services are programmed to run on each SLEE, and 3) which services are actively running on each SLEE, i.e., the SLEE's current load as a per-cent basis. This NRS sub-component 590 is a logically centralized function giving NOS another level of propagation for requests that the site LRMs 577a, . . . ,577c can not satisfy. Additionally, the NRS sub-component 590 includes an binary indicator for each SLEE 450 to indicate whether that SLEE is up or down, and whether a service utilization threshold has been reached by that SLEE. The "up" or "down" indicator and the utilization threshold application are used to determine if a SLEE is available to accept service requests from other services and the NRS sub-component can simply provide a binary indicator of whether or not a SLEE is available given these indicator and threshold applications. As an example, if a requested SLP object is found in a SLEE, but that SLEE does not have the capacity to instantiate the requested process, it will send a notification to the site LRM 577 that the utilization threshold for that SLEE has been reached and is incapable of handling further requests for that service. This information will also propagate to the NRS component 590 (FIG. 10).

Referring back to FIG. 8, the NGIN system implements a monitoring mechanism 595 for monitoring the memory capacity, database capacity, length of a queue for requested objects, amount of time in queue, and other resource/load parameters for each SLEE in the system. These factors are available to NOS 700 which makes a determination as to the SLEE's utilization threshold based on one or more of these factors. In addition to a fixed threshold, multiple thresholds may be used for hysteresis.

An illustrative example of the resource management functions performed by NOS including the NT, LRM, and NRS that enable NOS 700 to provide location-and platform-independent processing, while optimizing the overall processing capabilities of NGIN, is now described in greater detail in view of FIGS. 11(*a*)–11(*b*). In the LRM process flow 801 described with respect to FIGS. 11(*a*) and 11(*b*), it is assumed that a service S1 executing on SLEE 1 on a service control server 1, needs to invoke a service S2, as indicated at step 802. Service S1 may be a FD or Service logic program that has received an event service request from the switch fabric call control and needs to invoke another SLP, S2, e.g., in order to complete call processing.

Particularly, in view of FIG. 11(*a*), service S1 issues a request to NOS 700 using the logical name for SLP S2. When the SLP request for a service object is received, the NOS name translation function 570*a* is implemented as indicated at step 804, for determining if the NOS recognizes the requested service as actively running on the local service control server 1, i.e., has an object reference associated with the logical name of the requested service. Preferably, data stored in local server cache includes the following NOS naming data fields: 1) an SLP logical service name which typically is the logical name describing the service and is the name which the Feature Discriminator data point to; 2) an optional version number which describes the version of a particular service which may be needed, e.g., for a particular customer who requires that version of the service running, or a node, etc.; 3) the status including: deployed, i.e., when SA has deployed work packages to nodes but the services are not activated, active, i.e., indicating that the service is currently active, or fallback, when it is desired to fallback to a previous version of a service object, e.g., to provide a quick reversal; 4) the object name or reference which may include an IP address, port, and other information identifying the physical location of the object instance; 5) the in-service date and time and out of service date and time; 6) the error process object name, e.g., if the object is not available or unable to be activated; and 7) the fallback object name to be executed when in a fallback status. As additionally described in co-pending U.S. patent application Ser. No. 09/420,655 filed Oct. 19, 1999, a local server NOS naming process is benefitted from services provided by an LRM status processor (not shown) which updates the local server cache status database only with currently active services running in a particular SLEE in the service control server. This is so that the Local server NOS name translation function may first be performed locally. When NOS first gets a name request, it looks up a logical name to obtain an object name (or object reference). NOS gets the object name from the logical name and the node LRM process determines the best instance of the requested object to address based on one or more business rules, as indicated at step 806.

If, at step 804, the logical name is recognized and the object reference is available, then the process proceeds to the LRM function at step 806 to determine active ("available") instances of S2 running on the SLEE 1, in accordance with certain criteria, such as utilization thresholds. If no active instances are found, the LRM may check to see if S2 is programmed to run on SLEE 1, but has not been instantiated. If this is the case, NOS 700 may decide to instantiate an instance of S2 on SLEE 1, if SLEE 1 has enough available capacity. As mentioned, the LRM at the server level only knows what is active at the server and knows what has been instantiated. If the object is currently active and instantiated at the local server level, then the object reference for instantiating a new thread for this service is returned to the SLP request. NOS will initiate instantiation of a new service thread for performing the service requested based on the returned object reference and returns an object reference if not already instantiated.

If, at step 804, it is determined that SLEE 1 does not have enough available capacity, or if S2 is not available to be run on SLEE 1, then at step 810, the LRM on SLEE 1 sends a service request to the Site LRM 577*a*, (FIG. 10). The site LRM applies similar business rules and determines if an instance of S2 is active, or should be instantiated, on another SLEE at that site. Thus, at step 810, the node NOS name translation function is implemented for determining if the requested logical name is available at that node, i.e., whether another SLEE at the same or different local service control server at that node maintains an object reference associated with the logical name of the requested service. If the logical service name is recognized at step 810, the NT sub-component 570 queries NOS LRM 575 to determine which instance of S2 to use. The node LRM then applies business rules against a node cache status database (not shown) at step 814 in order to retrieve the desired object reference for the requested service, if active, and returns that address to the calling SLP (step 802, FIG. 11(*a*)). if it is determined that the service is not currently instantiated, or, that the required service on a particular SLEE may not be instantiated due to process load or other imposed constraints, then at step 818 an assignment and loading process is performed by checking the node cache status database and implementing applicable business rules relating to, e.g., service proximity, data proximity, thresholding, current processing loads, etc., instantiating the requested service in the SLEE where it is determined that the service object is capable for instantiation, and, returns the address to the calling SLP. It should be understood that a round robin scheme may be implemented in determining which service thread to instantiate when more than one service is available for instantiation per SLEE.

Returning back to FIG. 11(*a*), if, at step 810, it is determined that the current node does not recognize the requested logical name, i.e., the node cache does not have an object reference associated with the logical name of the requested service, or, due to applied business rules, may not instantiate the object at the node, then the global network resource status (NRS) process 590 is queried at step 822 to check the current status of SLEEs across the intelligent network 170 and to determine a SLEE which may handle the service request for S2. Prior to this, as indicated at step 820, a check is made to determine whether an index number representing the number of times that network resource management has been queried to find an object reference, has exceeded a predetermined limit, e.g., three times. If this threshold has been exceeded, the process terminates and the administrator may be notified that the service object cannot be found and that an error condition exists, as indicated at step 821. If the NRS query threshold has not been exceeded, then as indicated at step 822, the NRS process 590 determines which service node in the network may be capable of performing the requested service. After determining the node in the intelligent network, as indicated at step 822, the process continues to step 824, FIG. 11(*b*), where the node NOS name translation function 570*b* is implemented to obtain an object reference associated with the logical name of the requested service. If the logical service name at that node is not recognized at step 824, then the NRS query index number is incremented at step 829, and the process proceeds back to step 820, FIG. 11(*a*), to check if the index number threshold has been exceeded in which case an error condition exists. If, at step 820, FIG. 11(a), the NRS query index has not exceeded its predetermined threshold, the NRS process 590 is again queried at step 822 to find a new location of an available service at another service node.

If the logical name is recognized at step 824, then the process continues at step 826, to determine an address associated with the requested object reference in accordance with acceptable processing loads. This address is then returned to the requesting SLP as shown at step 802, FIG. 11(a). If, at step 826, it is determined that the service is not currently instantiated (active), then the process proceeds to step 828 to enable an assignment and loading process by checking the node cache status database 768 at that node, implementing business rules, and, instantiating the requested service in the SLEE where it is determined that the service object is available for instantiation. Subsequently, the address of the instantiated object SLP is returned to the requesting client at step 824.

Once an active instance of S2 has been selected, the object reference for that S2 instance is returned to NT on SLEE 1 (step 802). The NT then effectively translates the logical name S2 to an object identifier for the selected instance of S2, and uses that object identifier for S2 in the proceeding inter-process communications between S1 and S2. The object identifier includes an IP address, port, and other information identifying the physical location of the object instance. Once an object reference is determined, NOS then provides object connectivity between the two services by implementing the CORBA-compliant ORB, and data communications connection less protocols such as UDP/ID. The location of the called service, whether running on the same SLEE or on another SLEE at another site thousands of miles away, is completely transparent to calling service. Thus, if an SLP that is needed to service a call is instantiated on a SLEE at a remote site, the call is still held at the switch on which it was received. Preferably, once an object reference is accessed once, for example, at another site via the NRS level, NOS ensures that the object reference is cached at the requesting site for future reference, and audited, through service administration. Thus, in the instant example, in order to reduce subsequent look-ups by initiating a site LRM look-up when this service is again needed, the object reference for service S2, wherever it was located, is thereafter cached in the local cache in the LRM 575 of SLEE 1. It should be apparent to skilled artisans that there are a variety of ways in which service object reference data may be provided at a SLEE. For instance, a NOS data replication mechanism may be employed to replicate all object references at a site LRM 577 to each and every LRM for every SLEE at the site.

Figure 13A:
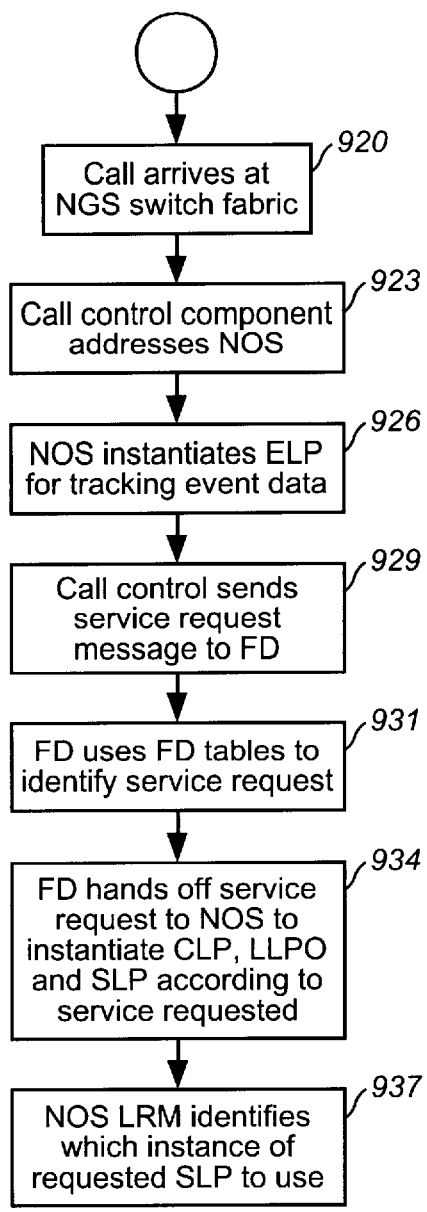
FIGS. 13(a)–13(c) depict an example process flow for performing 1-800/8xx call processing service.
Figure 13B:
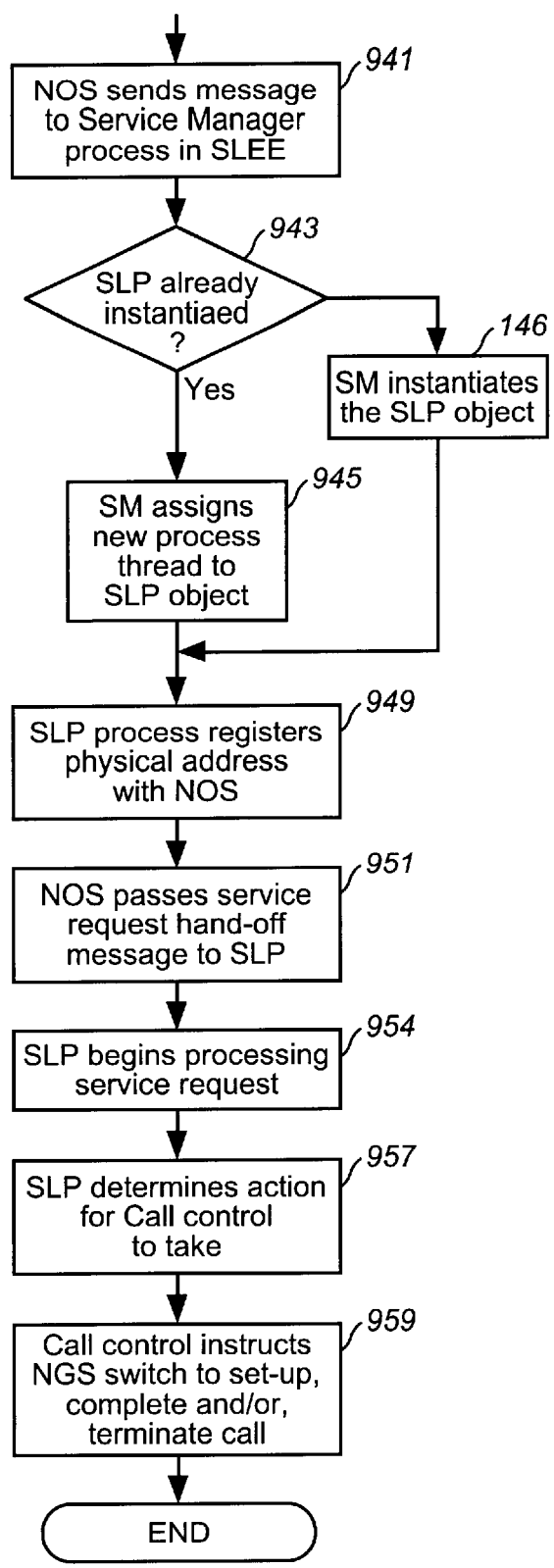
Figure 13C:
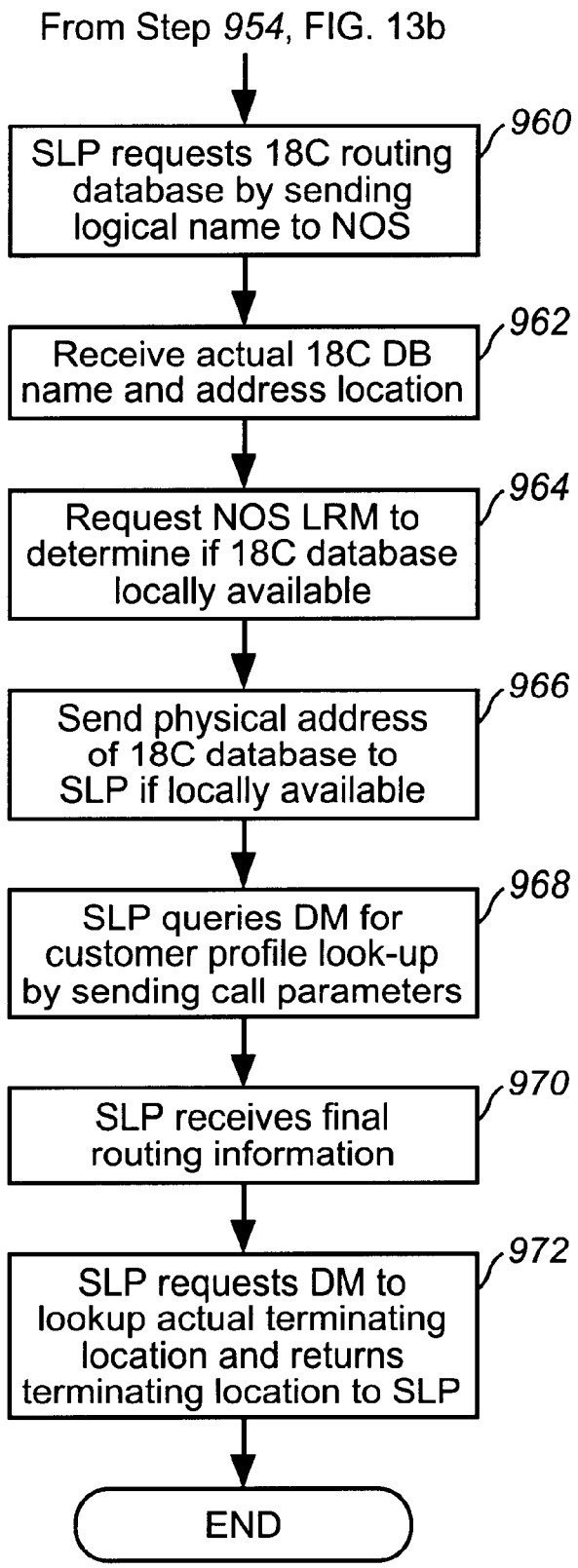

In the context of 1-800- call ("18C") , an 18C call processing and service utilization scenario is now described for exemplary purposes, with reference to the flow chart of FIGS. 13(a)–13(c) and the conceptual functional diagram of FIG. 18. First, as shown at step 920, a call first arrives at the NGS switch fabric 75. When the NGS receives a call, a bearer control component (FIG. 5) provides the call control component with the access line on which the call was received, as well as the ANI, dialed number, and other data needed for call processing. A call control component maintains a state model for the call, as executed in accordance with its programmed logic. Additionally included in the state model are triggers for instantiating an ELP 540 and sending a service request to a FD 510 as shown in FIG. 18. To instantiate an ELP, the NGS call control component 90 addresses a message to NOS, using a logical name for an ELP, as indicated at step 923, in FIG. 13(a). The NOS, in response, sends a message to a Service Manager object (FIG. 8) to instantiate an ELP within a SLEE and returns an object reference for that ELP back to call control, as depicted in step 926. The NGS call control component includes this object reference in a service request message that is sent to an FD in the SLEE, as indicated at step 929. Thus, all qualified event data that are generated for the call by any process are written to the instantiated ELP process. Particularly, the service request message is addressed to a logical name for FD; this logical name is translated by the NOS NT component to a physical address for an FD logic program that is running at the same service node on which the call was received. Included in the service request message is the dialed number, ANI, and other data.

Next, as indicated at step 931, the FD uses its feature discrimination table to identify which SLP is to handle the received service request. For example, if the received message is a 18C service request, it is to be handled by the 18C SLP. Table 3 below is an example abbreviated FD table having entries including pointers to various "toll-free", e.g., 1-800, call services.

```
Entry Port Table
    "001001" SLP pointer 'Vnet'
    "001002" Table pointer to FGD table
    FGD table
        1800* table pointer 800 table
        1888* table pointer 800 table
        1900* table pointer 900 table
        1* SLP pointer 'Local number'
    800 table
        1800collect      SLP pointer to '1-800-C'
        18008888000      SLP pointer 'OP Service'
        1800*            SLP pointer '800 service'
        1888*            SLP pointer '800 service'
``` where FGD is the feature group discriminator. Particularly, based on where the call originated in the network (switchboard) and the type of call received (e.g., 1-800), the FD will determine an appropriate SLP logical name. For instance, the identification "001002" indicates receipt of a call requiring a look-up in the FGD table (pointer to FGD table). The FGD table in turn, maintains pointers to other tables depending upon the called number, e.g., 800* where '*' is a delimiter. From this 800 table, for example, the FD obtains a pointer to the requested SLP logical name. Subsequently, this SLP is invoked and the service request is handed off to NOS which instantiates a CLP 545, LLPO 530 and the SLP 520 objects according to the 18C service requested. For instance, with respect to the LLPO, a logical name for the LLPO is provided to NOS based on the bearer control line on which the call was received. Identification of this line is based on either the ANI or the access line identified by the bearer control component 80. The ANI identifies the original access line that originated the call, which may or may not be the same access line on which NGS receives the call, i.e., the received call may have originated on a local network, for example, and passed to switch 75 on an interexchange carrier network. Therefore, features associated with a line, such as call waiting or call interrupt, can be identified by the ANI. The NOS translates the logical name for the LLPO to a physical address for an LLPO instantiation. While other logic programs (such as SLPs) may be instantiated at other sites, the LLPs are instantiated at the site at which their associated lines are. The LLPs are instantiated in the SLEE, which may be on a Service Control Server or on a call control server. Once instantiated, the LLPO queries Data Management for features associated with the line, maintains the state of the originating line, and will invoke any features such as call waiting or overflow routing when those features are invoked by the caller (i.e., call waiting) or network (i.e., overflow routing).

Referring to step 934, FIG. 13(*a*), the NOS receives a service request hand-off request from the feature discriminator containing the logical name representing the particular service to be invoked, e.g., 18C. The NOS identifies that the request contains a logical name and looks in its instance tables (not shown) to determine whether it has any SLP processes available to service this service request. It also identifies through the NOS LRM function which instance of the requested type to use, as indicated at step 937. Then, as indicated at step 941, NOS sends a request to the Service Manager object running on a Service Control SLEE to invoke the requested 18C SLP service. In the preferred embodiment, NOS selects the SLP from a Service Control server that received the original incoming service request notification from the NGS, however, it is understood that NOS could select the SLP in any service control component through implementation of the NOS LRM and based on its list of Service Control instances and their current status. As indicated at step 943, NOS determines whether the selected SLP is already instantiated and if the selected SLP is not already instantiated, will direct the SM to instantiate the SLP object, as indicated at step 946. Otherwise, if the selected SLP is already instantiated, the thread manager assigns a new process thread to the SLP object, as indicated at step 945.

The next step 949 of FIG. 13(*b*), requires that the instantiated SLP process registers its physical address with the NOS, and that the NOS allocates this SLP to the service request. Then, the NOS passes the service request hand-off message to the new SLP, as indicated at step 951. Parallel therewith, the NOS sends to the instantiated CLP all data, including object references for the instantiated SLP, ELP, and LLPO objects. Object references for the CLP and ELP are also provided to the LLPO and the SLP, so that the LLPO and the SLP can interface with the CLP and the ELP. Finally, as indicated at step 954, the SLP then begins processing the call in accordance with its programmed logic.

In the context of a 18C call, the 18C SLP 520 preferably obtains the necessary data from an 18C routing database (not shown) to make an appropriate decision. As shown in FIG. 13(*c*), the 18C SLP 520 invokes the following steps: sending a logical name for the 18C routing database it needs to the NOS NT at step 960; querying the DM with the logical 18C routing database name and receiving from DM the actual 18C routine DB name and its stored location, as indicated at step 962; requesting the NOS LRM to see if the 18C routing database is available locally, as shown at step 964, and if so, returning the physical address of the 18C database to the 18C SLP, as indicated at step 966; sending a query to data management for a customer profile lookup by sending the called 800-number, the line ID, originating switch trunk, and the ANI, as indicated at step 968; receiving from the DM the final routing information including the switch/trunk back to the 18C SLP, as indicated at step 970, and at step 972, requesting DM to look-up the actual terminating location (node) of the termination specified in the routing response and receiving from DM the actual terminating node location. Thereafter, the procedure entails sending the routing response information to the ELP 510 for placement in call context data, e.g., stored in DM; and, sending an outdial request with handoff command to the CLP 545 including the routing information. In this scenario, the terminating node may be remote, in which case it would be necessary to instantiate the terminating LLP on the remote node and performing a profile look-up to determine any features on the terminating line. In other service flow scenarios, the SLP may have to invoke one or more other SLPs.

Figure 14:
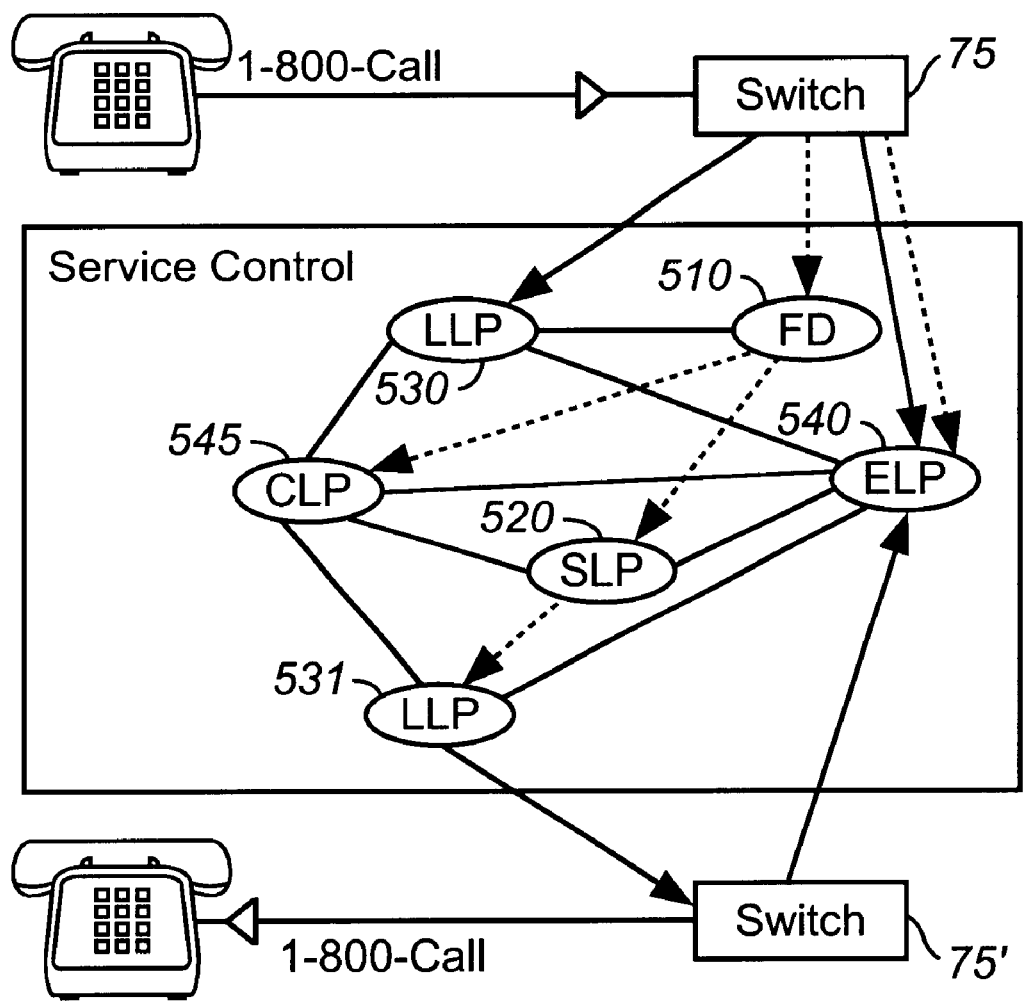
FIG. 14 depicts a call processing scenario as serviced by IDNA/NGIN.

Once the SLP has determined a network termination for the call, or otherwise determines an action for the Resource Complex to take, e.g., detecting DTMF digits or playing voice, it sends a service response message to NGS call control as indicated at step 957. Call Control then executes the instructions which may involve instructing the NGS switch 75' (FIG. 14) to set up and complete the call to a network termination, as shown at step 959.

More particularly, an outdial/handoff procedure is implemented which requires the CLP 545 to send the outdial with the handoff command to the LLPO (originating line) which is forwarded to a NOS agent at the call switch, which routes the call to the terminating node. The ELP process then writes the outdial call context data to DM.

Referring back to step 957, of the SLP returns to call control a physical address for a network termination, then an LLPT process 531 is instantiated for the line to which the call is terminated. This is done by enabling NOS to associate a logical name for the LLPT with the network termination provided by the SLP; this logical name is provided to NOS by either the SLP (in one embodiment) or by Call Control in a service request to an FD (in another embodiment). The NOS in turn instantiates the LLPT in a SLEE at the service node at which the terminating line exists.

Alternately, at step 957, the SLP may instead return a request for a specific resource, such as, for example an IVR function, in the example of processing 18C calls. The NGS determines which resource to assign, i.e., which switch port with IVR capabilities, VRU port, etc., and returns to the SLP an address for the resource. The SLP then identifies an address for the LLPT associated with that resource (via a query to Data Management) and requests instantiation of that LLPT. The call is then routed to that resource and processed, perhaps with another service request to NGIN.

When the call has completed (i.e., when both parties have disconnected), the LLPs receive a call completion notification from the NOS component at each switch 75, 75' (FIG. 14) and forwards the call completion notification to the CLP. The CLP forwards the call completion notification to the associated LLPs and ELP and are killed as triggered by the CLP notification. Prior to its termination, the ELP call detail data which needs to be maintained after the call completes, e.g., for billing and various other purposes, may first be stored.

A few preferred embodiments have been described in detail hereinabove. It is to be understood that the scope of the invention also comprehends embodiments different from those described, yet within the scope of the claims.

For example, the general purpose computer is understood to be a computing device that is not made specifically for one type of application. The general purpose computer can be any computing device of any size that can perform the functions required to implement the invention.

An additional example is the "Java" programming language can be replaced with other equivalent programming languages that have similar characteristics and will perform similar functions as required to implement the invention.

The usage herein of these terms, as well as the other terms, is not meant to limit the invention to these terms alone. The terms used can be interchanged with others that are synonymous and/or refer to equivalent things. Words of inclusion are to be interpreted as non-exhaustive in considering the scope of the invention. It should also be understood that various embodiments of the invention can employ or be embodied in hardware, software or microcoded firmware.

While the present invention has been disclosed and discussed in connection with the above-described embodiment, it will be apparent to those skilled in the art that numerous changes, variations and modifications within the spirit and scope of the invention are possible. Accordingly, it is, therefore, intended that the following claims shall encompass such variations and modifications.

What is claimed is:

1. A service control system for a communications network having a plurality of service nodes, each node having a memory storage device, and an execution environment for performing services in response to receipt of an event at a network switch element associated with a service node, said system comprising:

a service administrator device for generating a service profile at each node, a service profile including type and amount of service object resources relating to service processing at each node, and downloading said type and amount of service object resources to said node in accordance with said profile;

instantiation mechanism for instantiating service objects for execution in said one or more execution environments; and, resource management device for tracking execution environment resources at a service node, and maintaining list of service types available at each service node in said network with each service type having an associated capability status indicating whether a requested service is available for instantiation at a service node, wherein when said capability status indicates a requested service is unavailable for instantiation in said network, said resource management device communicating need for instantiating new service objects to said central administrator device for downloading and activation a new service at a service node.

2. The system as claimed in claim 1, wherein said instantiation mechanism includes:

a first object for loading one or more service objects from said memory storage system and instantiating said one or more objects for execution within said execution environment; and a second object corresponding to a particular service for allocating one or more service threads for each service instance corresponding co each received request for that service, each service thread instance having a unique identifier associated therewith.

3. The system as claimed in claim 2, further comprising a network operating system for providing real-time communication of messages and events between executing object instances, said second object corresponding to a particular service for channeling events and messages between said service instances, said events and messages including said unique identifier for coordinating received messages and events to the proper service instances.

4. The system as claimed in claim 3, further including an event queue mechanism allocated for each service thread instance for queuing events associated with said service instance that are received in the course of service execution, wherein events have an associated priority indicating order in which said event should be performed, said event queue device enabling processing of received events according to its associated priority.

5. The system as claimed in claim 3, further comprising a class loader process for initially loading one or more service objects from said memory storage system according to a configuration file implementing an initial service capability for said service node, said class loader responsible for instantiating said first object and any service objects to be available according to a predefined service capability strategy.

6. The system as claimed in claim 3, wherein said second object corresponding to a particular service includes thread manager instance for comparing amount of thread instances associated with a service with a predetermined threshold determined in said service profile, and generating warning signal to said resource management device when said execution environment no longer supports instantiation of new service thread instances.

7. The system as claimed in claim 6, wherein said service object instantiation mechanism includes said network operating system, said resource management device further tracking processing capability of an execution environment at each service node and providing an indication to said network operating system whether an execution environment at a service node may execute a service based on its processing capability.

8. The system as claimed in claim 7, wherein said resource management device further communicates an overload status indication to said network operating system when a number of service threads currently executing at an execution environment exceeds said predetermined threshold and preventing further service object instantiations at said execution environment.

9. The system as claimed in claim 3, wherein said instantiation mechanism comprises:

a registry of active service object threads corresponding to instances of services executing at an execution environment at each said execution environment; and, mapping device for mapping a service logical name with an object reference, said network operating system utilizing said object reference for enabling instantiation of a requested service object thread instance in a local execution environment.

10. A method for providing services at service nodes in a communications network, each service node having a memory storage device, and an execution environment for performing services in response to receipt of an event at a network switch element associated with a service node, said method comprising:

generating a service profile for each service node including type and amount of service object resources relating to service processing at each node, and downloading said type and amount of service object resources to said node in accordance with said profile;

instantiating service objects for execution in said one or more execution environments; and, tracking execution environment resources at a service node by maintaining list of service types available at each service node with each service type having an associated capability status indicating whether a requested service is available for instantiation at a service node;

wherein when said capability status indicates a requested service is unavailable for instantiation in said network, communicating need for instantiating new service objects to a central administrator device for downloading and activating a new service object at a service node.

11. The method as claimed in claim 10, wherein said instantiating step includes:

providing a first object for loading one or more service objects from said memory storage system and instantiating said one or more objects for execution within said execution environment according to received service requests; and providing a second object corresponding to a particular service for allocating one or more service threads for each service instance corresponding to each received request for that service, each service thread instance having a unique identifier associated therewith.

12. The method as claimed in claim 11, further comprising the step of communicating messages and events generated during service object execution between one or more executing service object in support of service processing, said events and messages being identified by said unique identifier to correct executing service instances via said second object.

13. The method as claimed in claim 12, further including the step of queuing events associated with an executing service instance that are received in the course of service execution, said events having an associated priority indicating order in which said event should be performed, wherein said received events are processed in accordance with its corresponding priority.

14. The method as claimed in claim 10, further including: initially loading one or more service objects from said memory storage system according to a configuration file providing an initial service capability for said service node, said class loader responsible for instantiating said first object and any service objects to be available according to a predefined service capability strategy.

15. The method as claimed in claim 11, wherein said step of tracking execution environment resources at a service node includes:

comparing amount of thread instances associated with a service with a predetermined threshold determined in said service profile; and generating a warning signal to a resource management device when an execution environment no longer supports instantiation of new service thread instances.

16. The method as claimed in claim 10, wherein said instantiation mechanism comprises:

maintaining registry of active service object threads corresponding to instances of services executing at an execution environment at each said service node; and, mapping a service logical name with an object reference; and, utilizing said object reference for enabling instantiation of a requested service object thread instance in a local execution environment.

* * * * *